US010606016B2

(12) United States Patent
Marcouiller et al.

(10) Patent No.: US 10,606,016 B2
(45) Date of Patent: Mar. 31, 2020

(54) FIBER DEMARCATION POINT AND SLACK STORAGE

(71) Applicant: CommScope Technologies LLC, Hickory, NC (US)

(72) Inventors: Thomas Marcouiller, Shakopee, MN (US); Oscar Fernando Bran De León, Belle Plaine, MN (US); Erik James Gronvall, Bloomington, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/154,249

(22) Filed: Oct. 8, 2018

(65) Prior Publication Data

US 2019/0137718 A1  May 9, 2019

Related U.S. Application Data

(63) Continuation of application No. 15/427,603, filed on Feb. 8, 2017, now Pat. No. 10,094,997.
(Continued)

(51) Int. Cl.
*G02B 6/00* (2006.01)
*G02B 6/44* (2006.01)
(Continued)

(52) U.S. Cl.
CPC ......... *G02B 6/4457* (2013.01); *B65H 49/325* (2013.01); *B65H 49/327* (2013.01);
(Continued)

(58) Field of Classification Search
CPC .... G02B 6/4457; G02B 6/3897; B65H 75/26; B65H 75/14; B65H 2701/32
See application file for complete search history.

(56) References Cited

U.S. PATENT DOCUMENTS 2,767,426 A * 10/1956 Grupp ................. E05D 13/1292
16/198
2,952,420 A    9/1960 Von Hoorn
(Continued)

FOREIGN PATENT DOCUMENTS

EP    2 159 618 A1    3/2010

OTHER PUBLICATIONS

International Search Report and Written Opinion for Application No. PCT/US2017/017042 dated Apr. 25, 2017.
(Continued)

*Primary Examiner* — Ellen E Kim
(74) *Attorney, Agent, or Firm* — Merchant & Gould P.C.

(57) ABSTRACT

A cable spool includes first and second curved flanges extending radially outwardly from first and second axial ends of a drum. The flanges have outer edges that cooperate to define an annular slot providing access to a passageway surrounding the drum. The slot has a width that is less than half the height of the drum. A cable is wrapped around the drum. A closure having an environmentally sealed interior may receive an end of the cable. A second cable can be deployed from a second spool and coupled to the end of the cable within the closure. The second spool can be mounted with the cable spool. A cover can be placed over the spools for aesthetic or protection reasons.

17 Claims, 19 Drawing Sheets

Related U.S. Application Data

(60) Provisional application No. 62/292,651, filed on Feb. 8, 2016, provisional application No. 62/308,507, filed on Mar. 15, 2016, provisional application No. 62/318,521, filed on Apr. 5, 2016.

(51) Int. Cl.
*B65H 49/32* (2006.01)
*H02G 11/02* (2006.01)
*B65H 75/14* (2006.01)
*B65H 75/22* (2006.01)
*B65H 75/26* (2006.01)
*B65H 75/28* (2006.01)

(52) U.S. Cl.
CPC ........... *B65H 75/14* (2013.01); *B65H 75/143* (2013.01); *B65H 75/22* (2013.01); *B65H 75/26* (2013.01); *B65H 75/28* (2013.01); *H02G 11/02* (2013.01); *B65H 2701/32* (2013.01)

(56) References Cited

U.S. PATENT DOCUMENTS

| | | | |
|---|---|---|---|
| 4,685,636 A | 8/1987 | Eaton | |
| 5,803,388 A * | 9/1998 | Saliba | G11B 23/08728 242/348 |
| 5,908,172 A | 6/1999 | Pierro et al. | |
| 5,992,787 A | 11/1999 | Burke | |
| 6,234,418 B1 | 5/2001 | Donaldson | |
| 7,017,721 B1 * | 3/2006 | Bradford | H02G 11/02 191/12.4 |
| 7,220,144 B1 | 5/2007 | Elliot et al. | |
| 7,251,966 B2 * | 8/2007 | Fawcett | E05L 345/005 242/382 |
| 7,407,128 B1 * | 8/2008 | Chang | B65H 75/4431 242/385.4 |
| 7,654,484 B2 | 2/2010 | Mogensen et al. | |
| 8,189,984 B2 * | 5/2012 | Kowalczyk | G02B 6/4441 385/135 |
| 8,230,995 B2 | 7/2012 | Andrews et al. | |
| 8,254,740 B2 | 8/2012 | Smith et al. | |
| D667,390 S | 9/2012 | Matera | |
| 8,434,200 B2 * | 5/2013 | Chen | A43C 11/165 2/418 |
| 8,565,572 B2 * | 10/2013 | Krampotich | G02B 6/4452 385/135 |
| 8,805,152 B2 | 8/2014 | Smith et al. | |
| 9,042,700 B2 | 5/2015 | Smith et al. | |
| 9,097,870 B2 | 8/2015 | Torman et al. | |
| 9,126,800 B2 * | 9/2015 | Penumatcha | B65H 75/14 |
| 9,188,760 B2 * | 11/2015 | Kowalczyk | G02B 6/4457 |
| 9,377,599 B2 | 6/2016 | Smith et al. | |
| 9,459,424 B2 | 10/2016 | Smith et al. | |
| D774,877 S | 12/2016 | Gonzalez et al. | |
| 9,541,727 B2 | 1/2017 | Torman et al. | |
| 9,555,999 B2 | 1/2017 | Smith et al. | |
| 9,632,273 B2 | 4/2017 | Smith et al. | |
| 9,841,575 B2 * | 12/2017 | Lecoq | G02B 6/4457 |
| 9,891,399 B2 * | 2/2018 | Krampotich | B65H 49/28 |
| 10,094,997 B2 | 10/2018 | Marcouiller et al. | |
| 2001/0048044 A1 * | 12/2001 | Sugata | B60R 16/027 242/388.1 |
| 2003/0122023 A1 | 7/2003 | Pitcher | |
| 2005/0247813 A1 * | 11/2005 | Kovacevich | A42B 3/08 242/388.6 |
| 2008/0230643 A1 | 9/2008 | Ornskar | |
| 2009/0074370 A1 * | 3/2009 | Kowalczyk | G02B 6/4441 385/135 |
| 2011/0259991 A1 | 10/2011 | Goldstein et al. | |
| 2013/0075522 A1 * | 3/2013 | Penumatcha | B65H 75/14 242/614 |
| 2013/0170811 A1 | 7/2013 | Kowalczyk et al. | |
| 2014/0091169 A1 * | 4/2014 | Ott | G02B 6/4457 242/594.5 |
| 2015/0093088 A1 * | 4/2015 | Matz | G02B 6/4446 385/135 |
| 2015/0241653 A1 | 8/2015 | Krampotich et al. | |
| 2016/0028485 A1 * | 1/2016 | Khemakhem | H04W 88/085 398/117 |

OTHER PUBLICATIONS

Extended European Search Report for Application No. 17750708.4 dated Jul. 8, 2019.

\* cited by examiner

FIBER DEMARCATION POINT AND SLACK STORAGE

CROSS REFERENCE TO RELATED APPLICATIONS

This application is a continuation of U.S. application Ser. No. 15/427,603, filed Feb. 8, 2017, now U.S. Pat. No. 10,094,994, which application claims the benefit of U.S. Provisional Application No. 62/292,651, filed Feb. 8, 2016, U.S. Provisional Application No. 62/308,507, filed Mar. 15, 2016, and U.S. Provisional Application No. 62/318,521, filed Apr. 5, 2016, and titled "Fiber Demarcation Point and Slack Storage," which applications are incorporated herein by reference in their entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 10 deploying fiber optic lines. As shown, the network 10 can include a central office 11 that connects a number of end subscribers 15 (also called end users 15 herein) in a network. The central office 11 can additionally connect to a larger network such as the Internet (not shown) and/or a public switched telephone network (PSTN). The network 10 can also include fiber distribution hubs (FDHs) 13 that distribute optical signals to the end users 15. The various lines of the network 10 can be aerial or housed within underground conduits.

The portion of the network 10 that is closest to central office 11 is generally referred to as the F1 region, where F1 is the "feeder fiber" from the central office 11. The portion of the network 10 closest to the end users 15 can be referred to as an F2 portion of network 10. The network 10 includes a plurality of break-out locations 12 at which branch cables are separated out from the main cable lines. Branch cables are often connected to drop terminals 14, for example, via fiber distribution hubs 13. The drop terminals 14 include connector interfaces for facilitating coupling of the fibers of the branch cables to a plurality of different subscriber locations 15.

SUMMARY

Some aspects of the disclosure are directed to a cable spool configured to hold a cable thereon. In some implementations, the cable spool defines an outer slot through which the cable is inserted. The outer slot is sized to apply sufficient friction to the cable to inhibit unwinding of the cable absent a force applied by a user.

In some certain implementations, the outer slot is sized smaller than a width of the cable. In certain examples, the outer slot is defined between two lips that flex outwardly to allow the cable to pass through the slot. In examples, the cable spool is configured to allow winding of the cable only over the center of the cable. In certain examples, the cable spool is formed from two identical housing members.

In accordance with certain aspects of the disclosure, a cable spool assembly includes a drum having a radius that corresponds to a minimum bend radius of the cable; a first flange extending radially outwardly from a first axial end of the drum to a first circumferential edge; and a second flange extending radially outwardly from a second axial end of the drum to form a cable spool. The second flange extends to a second circumferential edge so that the second flange opposes the first flange. The second circumferential edge is spaced from the first circumferential edge by a gap. The gap is smaller than a maximum cross-dimension of the cable.

In certain implementations, the first flange is defined by a first housing member and the second flange is defined by a second housing member.

In certain examples, the first and second housing members cooperate to define the drum.

In certain examples, the first and second housing members are identical.

In certain examples, the first and second housing members latch together.

In certain examples, the first and second housing members are fastened together.

In certain implementations, each of the first and second flanges bow outwardly away from the opposing flange.

In certain implementations, the drum defines a concave outer surface facing outwardly towards the gap.

In certain implementations, the first and second circumferential edges each define a curved lip at the gap.

In certain implementations, the drum is hollow. In certain examples, an inner surface of the drum is generally cylindrical.

In certain implementations, at least one of the flanges defines an aperture through which a short length of the cable at one end of the cable extends.

In certain examples, the one end of the cable is terminated by a drop terminal. In certain examples, the one end of the cable is terminated by a single fiber connector. In certain examples, the one end of the cable is terminated by ruggedized optical connector.

In certain implementations, a mounting bracket including a base and a support structure. The base is configured to mount to a surface. The support structure is sized to hold the cable spool.

In certain implementations, a locking cap configured to couple to the mounting bracket. The locking cap inhibits removal of the cable spool from the support structure when coupled to the mounting bracket.

In certain implementations, the locking cap inhibits rotation of the cable spool relative to the mounting bracket when coupled to the mounting bracket. In certain examples, the locking cap defines notches sized to receive ribs of the cable spool.

In certain implementations, the mounting bracket includes a receiving structure disposed within the support structure. The receiving structure defines apertures. The locking cap includes latch arms sized to snap into the apertures of the receiving structure of the mounting bracket.

In accordance with certain aspects of the disclosure, a cable deployment system includes a cable spool; and a cable. The cable spool includes a drum extending along a height between first and second axial ends. The cable spool also includes first and second curved flanges extending from the first and second axial ends, respectively, of the drum. The first and second curved flanges have outer edges that cooperate to define an annular slot providing access to a passageway surrounding the drum. The slot has a width that is less than half the height of the drum. The cable is wrapped around the drum through the passageway. The cable has a first end accessible from an exterior of the cable spool.

In accordance with certain aspects of the disclosure, a cable spool assembly includes a first housing member defining an annular shape; and a second housing member defining an annular shape. The first housing member defines a central aperture. The first housing member also defines a first concave surface at an outer circumferential portion of the first housing member. The second housing member defines a central aperture. The second housing member also defines a second concave surface at an outer circumferential portion of the second housing member. The second housing member is configured to attach to the first housing member so that the central apertures are coaxial and so that the second concave surface faces the first concave surface.

In accordance with certain aspects of the disclosure, a method of deploying cable including paying out a cable from a spool by pulling a connectorized end of the cable away from the spool so that the spool rotates about a rotational axis extending through a drum of the spool; plugging the connectorized end of the cable into a network port; and mounting the spool at an end user location. An excess length of the cable remains on the spool. An opposite end of the cable is terminated by a connector disposed inside of a sealed closure that is carried with the spool.

In certain implementations, the cable is a first cable and the spool is a first spool. The method further includes paying out a second cable from a second spool by pulling on a first end of the second cable; routing the first end of the second cable to an interior port at the end user location; storing excess length of the second cable on the second spool; and connecting an opposite end of the second cable to the second end of the first cable within the closure.

In accordance with certain aspects of the disclosure, a method of deploying cable includes providing a first cable wound on a first cable spool; providing a second cable wound on a second cable spool; deploying an entirety of the first cable from the first cable spool; deploying a portion of the second cable from the second cable spool by pulling on a first axial end of the cable; mounting the second cable spool at a deployment location, the second cable spool holding overlength of the second cable; and disposing a second axial end of the cable adjacent the deployment location. The second cable extends between a first end and a second end, the second end being optically coupled to one end of the first cable.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a cable spool configured to hold a cable. In some implementations, the cable spool defines an outer slot through which the cable is inserted. In certain implementations, the outer slot is sized smaller than a width of the cable. In certain examples, the outer slot is defined between two lips that flex outwardly to allow the cable to pass through the slot. In certain examples, the outer slot is centered on a drum of the cable spool. In examples, the cable spool is configured to allow winding of the cable only over the center of the cable.

Figure 2:
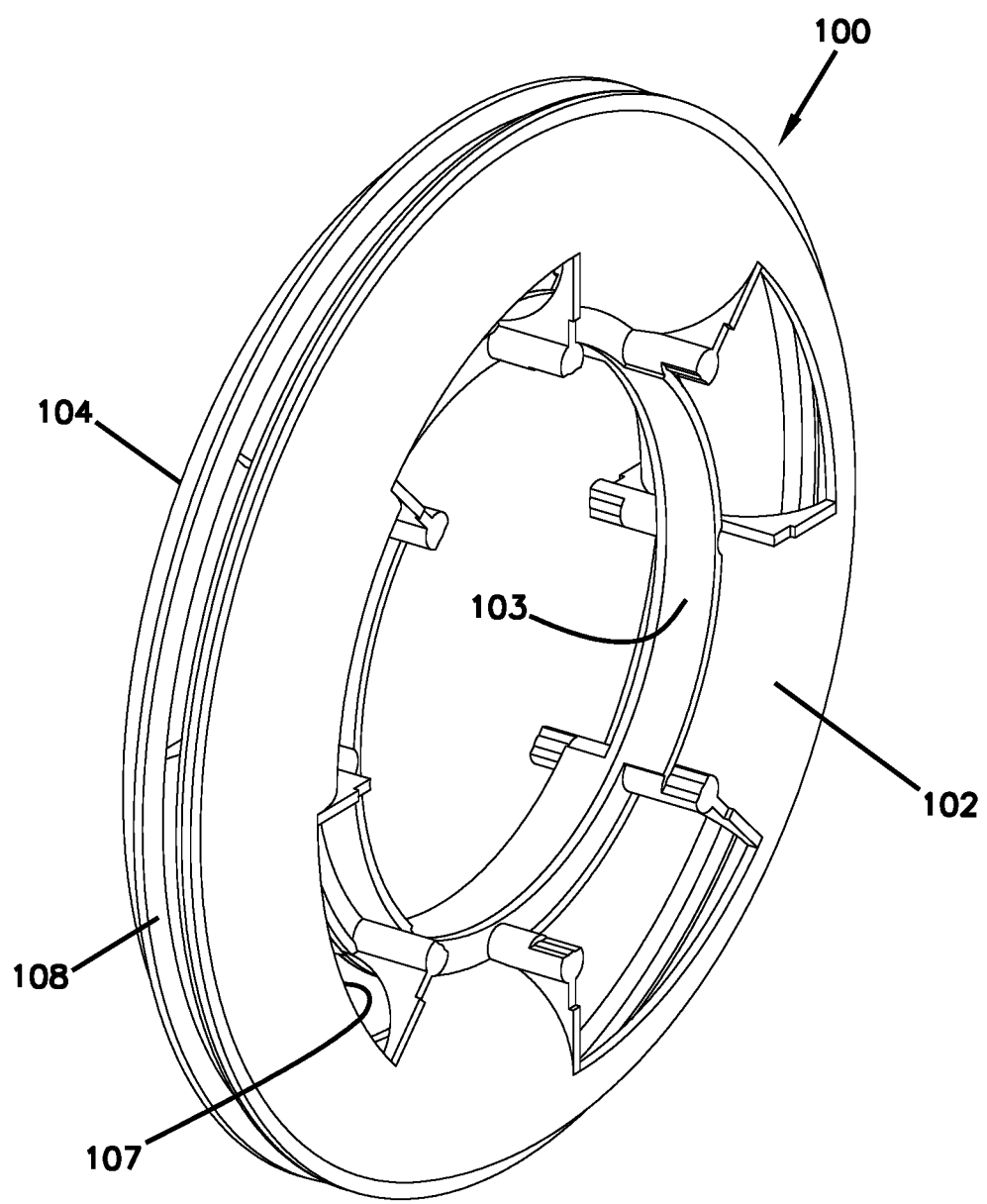
FIG. 2 is a perspective view of an example cable spool configured in accordance with the principles of the present disclosure.

FIG. 2 illustrates an example cable spool 100 configured in accordance with the principles of the present disclosure. The cable spool 100 includes a drum 105 sized to correspond with a minimum bend radius of the cable. In certain implementations, the drum 105 has a radius that equals the minimum bend radius of the cable. In certain implementations, the drum 105 has a radius that is slightly larger than the minimum bend radius of the cable. In some implementations, the drum 105 defines a concave outer surface. In other implementations, the drum 105 defines a cylindrical outer surface.

The cable spool 100 defines an outer slot 108 through which a cable can be routed onto a drum 105 of the cable spool 100. The outer slot 108 is sized to apply friction to the cable as the cable passes through the outer slot 108. The outer slot 108 is sized to be less than a maximum width of the cable. In an example, the outer slot 108 is sized to be less than a diameter of a round cable. In another example, the outer slot 108 is sized to be less than a widest dimension of a flat, oblong, or other shaped cable. In certain implementations, the slot 108 expands to accommodate the cable when the cable passes through the slot 108.

Figure 3:
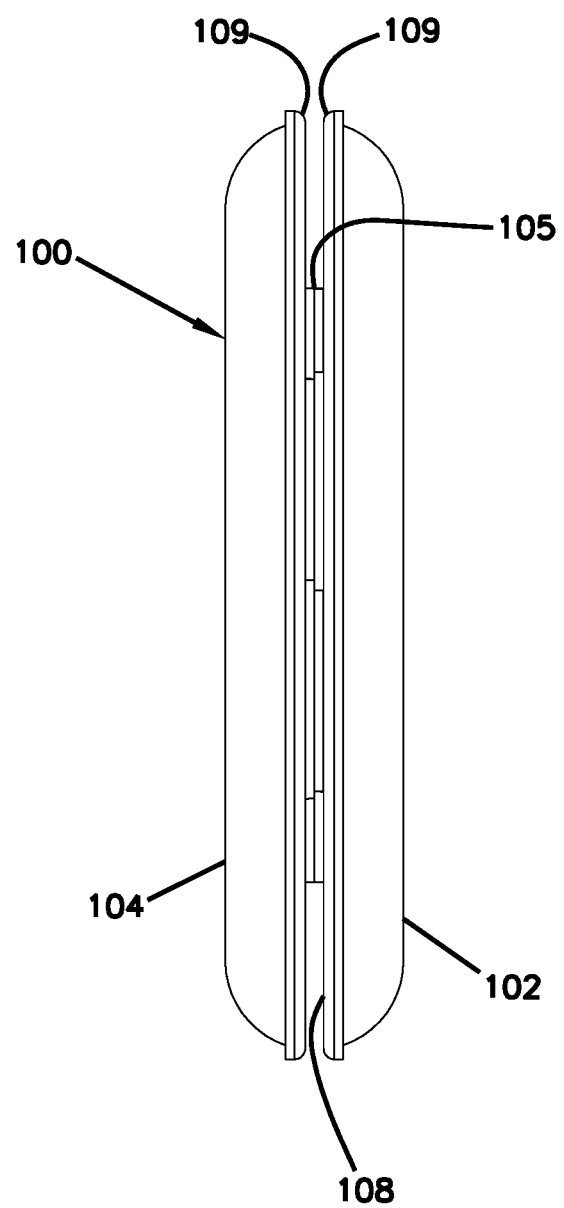
FIG. 3 is an end view of the cable spool of FIG. 2.

In certain implementations, the cable spool 100 includes a first flange 102 extending radially outwardly from a first axial end of the drum 105 and a second flange 104 extending radially outwardly from a second axial end of the drum 105. Outer circumferential edges of the flanges 102, 104 are spaced from each other to define the slot 108. In certain examples, the outer circumferential edges can define a tapered or curved lip 109 (FIG. 3) to aid in guiding the cable through the slot 108. The flanges 102, 104 are sufficiently flexible to enable expansion of the slot 108 to accommodate the cable as a user pulls or pushes the cable through the slot 108. The flanges 102, 104 are sufficiently rigid to retain the cable unless a user applies a force to the cable.

Figure 6:
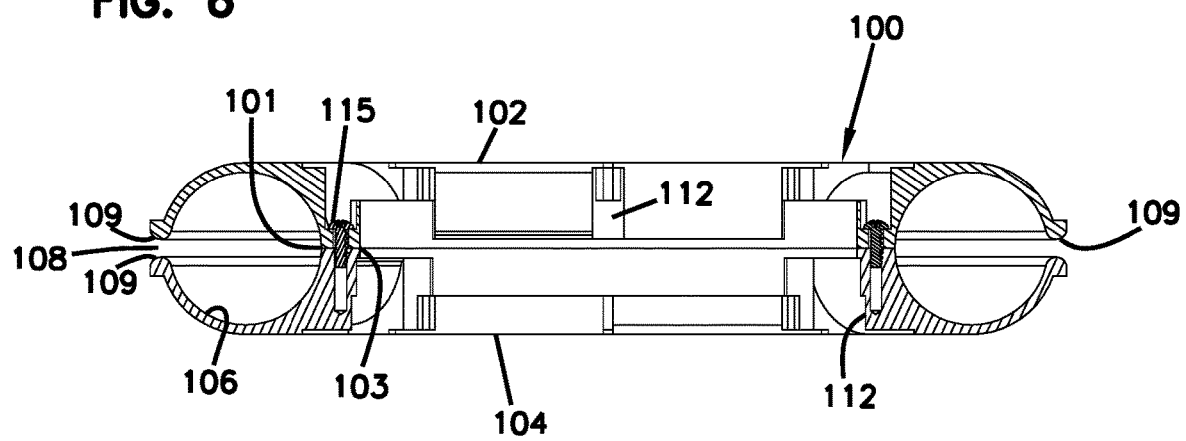
FIG. 6 is a transverse cross-sectional view of the cable spool of FIG. 5 taken along the 6-6 line.
Figure 7:
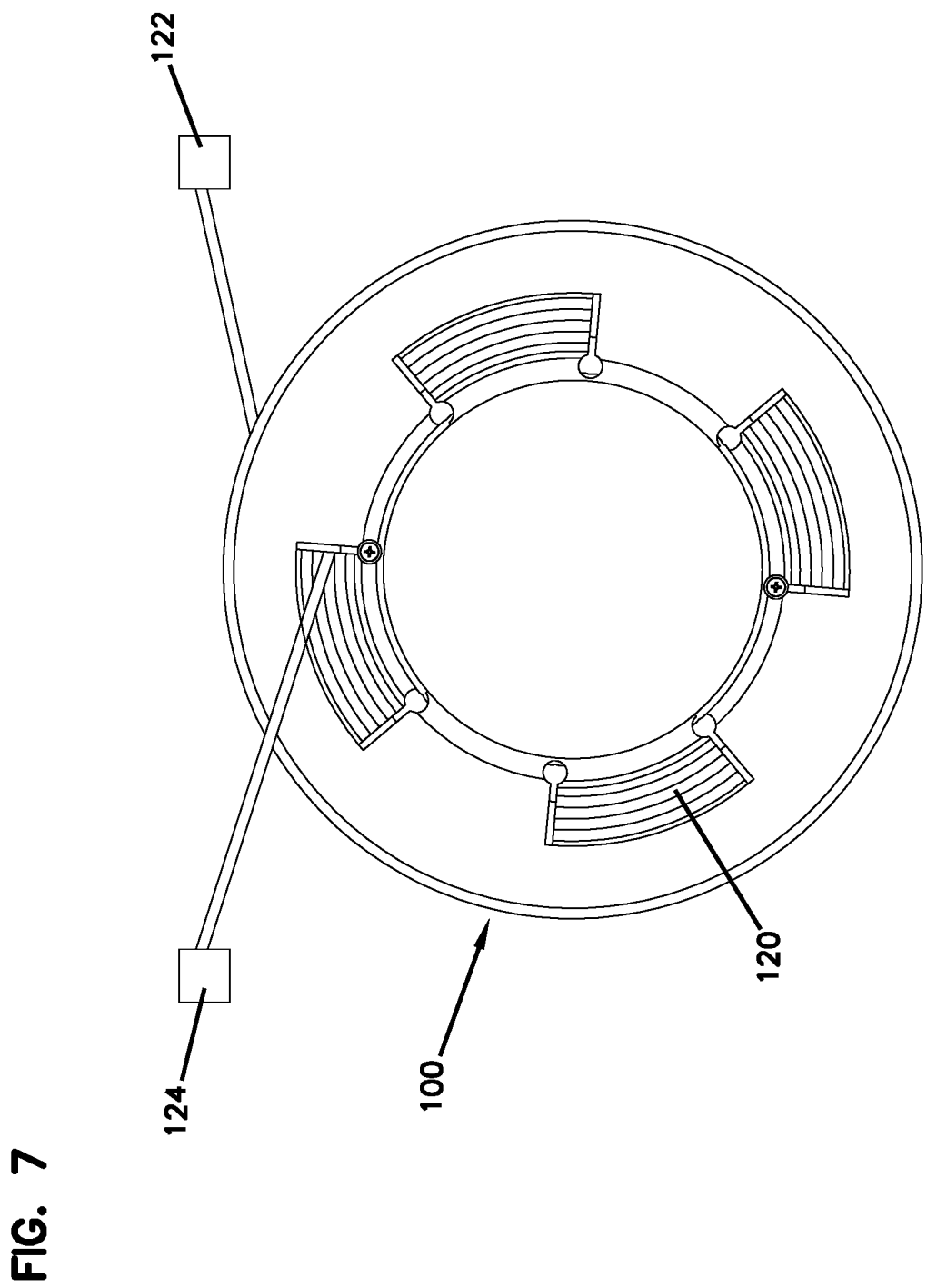
FIG. 7 is a front view of the cable spool of FIG. 2 with a cable wound thereon.

In certain implementations, a portion of each of the flanges 102, 104 curves towards the opposite flange 104, 102 as the flange 102, 104 extends radially outwardly. The flanges 102, 104 cooperate to define an annular passageway 106 (FIG. 6) around the drum 105. The cable guided through the slot 108 and onto the drum 105 is wound within the annular passageway 106. In some implementations, the outer passageway 106 is at least twice as large as the slot 108. In certain implementations, the outer passageway 106 is at least three times as large as the slot 108. In certain implementations, the outer passageway 106 is at least four times as large as the slot 108. In certain implementations, the outer passageway 106 is at least five times as large as the slot 108.

In certain implementations, the cable spool 100 defines a central aperture 103 through the drum 105. In certain examples, the central aperture 103 is defined by a cylindrical inner surface of the drum 105. In certain examples, a rod or other supporting member can be inserted through the central aperture 103 to enable the cable spool 100 to be spun on the rod to facilitate deployment of a cable wound on the cable spool 100.

In certain implementations, at least one of the flanges 102, 104 defines a window aperture 107 that provides access to the annular passageway 106. In certain examples, the flange 102, 104 defines a plurality of circumferentially spaced window apertures 107. In certain examples, both flanges 102, 104 define a plurality of circumferentially spaced window apertures 107. In some examples, the window apertures 107 of the first flange 102 do not align with the window apertures 104 of the second flange 104. In other examples, however, the window apertures 107 of the first flange 102 align with the window apertures 104 of the second flange 104.

In certain examples, a second axial end of the cable can be inserted through the window aperture 107 so that the second axial end of the cable is disposed external of the cable spool 100. The cable can then be wound within the annular passageway 106. Prior to deployment, the first axial end of the cable can be disposed within the annular passageway 106 or external of the cable spool 100. The cable is deployed by pulling on the first axial end of the cable. The second axial end rotates with the cable spool 100 during deployment.

Figure 4:
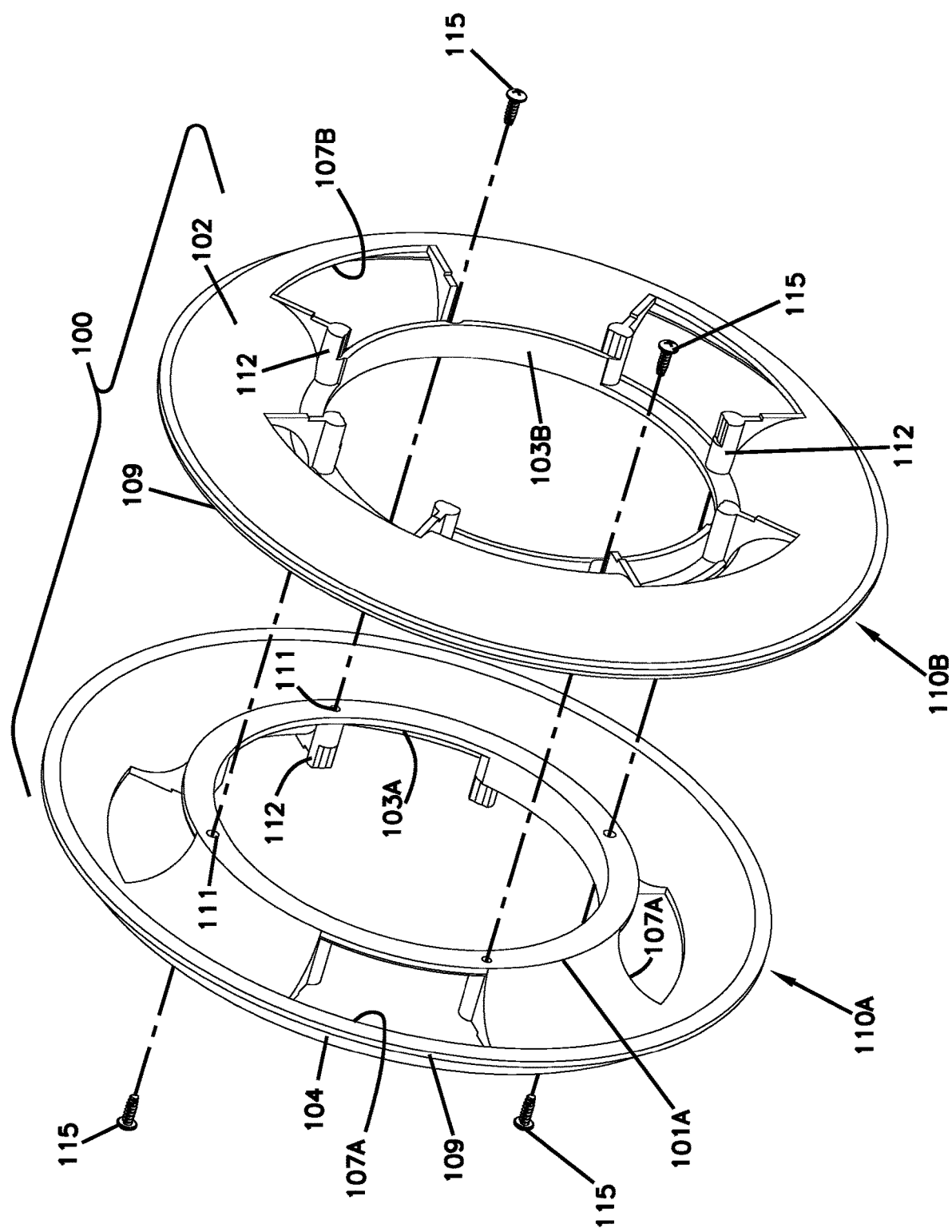
FIG. 4 is an exploded view of the cable spool of FIG. 2.
Figure 5:
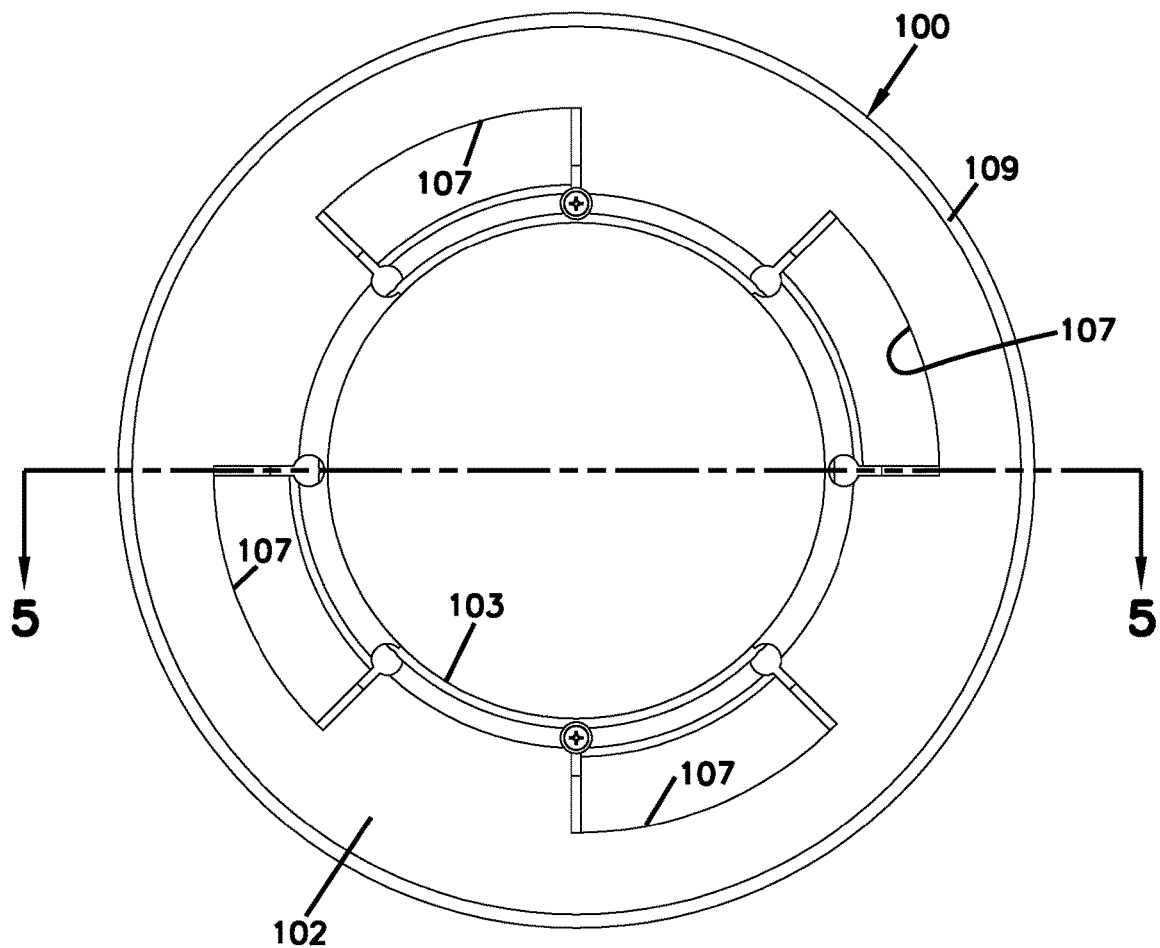
FIG. 5 is a front view of the cable spool of FIG. 2.

As shown in FIG. 4, the cable spool 100 can be formed from a first housing member 110A and a second housing member 110B that couple together. In some implementations, the first and second housing members 110A, 110B cooperate to define the drum 105. In other implementations, one of the housing members 110A, 110B defines the drum 105. In certain implementations, each of the housing members 110A, 110B defines one of the flanges 102, 104. Accordingly, the housing members 110A, 110B cooperate to define the annular passageway 106. In some examples, the first and second housing members 110A, 110B are identical.

In some implementations, the first and second housing members 110A, 110B latch together. In other implementations, the first and second housing members 110A, 110B can be attached using fasteners 115. In certain such implementations, each housing member 110A, 110B defines fastening apertures 111 through which the fasteners 115 can be inserted. In certain implementations, each housing member 110A, 110B can define fastener support structures defining inner threaded channels in which to receive the fasteners 115. In certain examples, each housing member 110A, 110B includes fewer fastener support structures than fastening apertures 111.

In use, a user winds a cable 120 onto the spool 100 by threading one end 124 of the cable 120 through the outer slot 108. In some implementations, the end 124 is disposed within the annular passageway 106. In other implementations, the end 124 is routed through one of the window apertures 107 of one of the flanges 102, 104. The user continues to wind the cable onto the spool 100 through the slot 108 to wrap the cable around the drum 105. In some implementations, the cable 120 is wound until an opposite end 122 of the cable 120 is received in the passageway 106. In other implementations, the end 122 of the cable 120 remains external of the spool 100.

In certain implementations, the outer slot 108 is positioned relative to the drum and is sized relative to the cable 120 so that the user winds the cable 120 over the center of the cable 120 and onto the drum 105. Accordingly, the size of the slot 108 inhibits the user from twisting the cable during winding. The size of the slot 108 also inhibits the cable from passing through the slot 108 without force being applied by the user. Accordingly, the annular passageway 106 can contain the cable 120 against a spring force provided by bending strength members (e.g., fiberglass rods) of the cable 120.

The cable spool 100 can be used to store excess length of the cable 120 after deployment of the cable 120. The cable spool 100 can be mounted to a bracket, pole, behind a wall box, etc. when the cable has been deployed. Part of the cable 120 also can be wound back on the cable spool 100 if too much is initially paid out from the cable spool 100.

In accordance with some aspects of the disclosure, the end 124 of the cable spool 100 that is routed through the window aperture 107 can be sealed within a protective closure 141. The protective closure 141 provides environmental sealing protection of the end 124. In some implementations, the end 124 is connectorized. In certain examples, the connectorized end 124 is received at an adapter 145 disposed within the protective closure 141. In other implementations, the end 124 is unconnectorized. In certain examples, the end 124 can be connectorized in the field and plugged into the adapter 145. In certain examples, the unconnectorized end 124 can be stored in the closure 141.

In some implementations, the closure 141 has a clamshell configuration that provides access to the cable end 124. In certain implementations, the closure 141 can hold the adapter 145 at an axially fixed position and/or a rotationally fixed position. An example structure suitable for use as the closure 141 is the FIC Box offered by CommScope of Hickory, N.C. In other implementations, the closure 141 can be a ruggedized optical adapter (e.g., a DLX or HMFOC adapter). In still other implementations, the end 124 can be a ruggedized male connector and a ruggedized female connector that environmentally seal to a female or male ruggedized connector instead of connecting within a closure 141.

The protective closure 141 revolves with the window aperture 107 of the cable spool 100 when the cable spool 100 rotates about a rotation axis extending through the central aperture 103. In certain implementations, the cable spool 100 is configured to carry the closure 141. For example, one of the flanges 102, 104 of the cable spool 100 may include latch fingers or other retention structures to receive the closure 141. In other implementations, however, the closure 141 can be taped, tied, or otherwise secured to the cable spool 100. In still other implementations, the closure 141 can be loose relative to the cable spool 100.

In use, a user deploys the cable 120 from the cable spool 100 by pulling the end 122 of the cable 120 relative to the cable spool 100. In some implementations, the user can position the cable spool 100 at an end user location and pull the cable end 122 to a drop terminal or other network node to deploy the cable 120. In other implementations, the user can position the cable spool 100 and end 122 at the drop terminal and walk the cable spool 100 away from the drop terminal or other network node and towards the end user location to deploy the cable 120.

Figure 1:
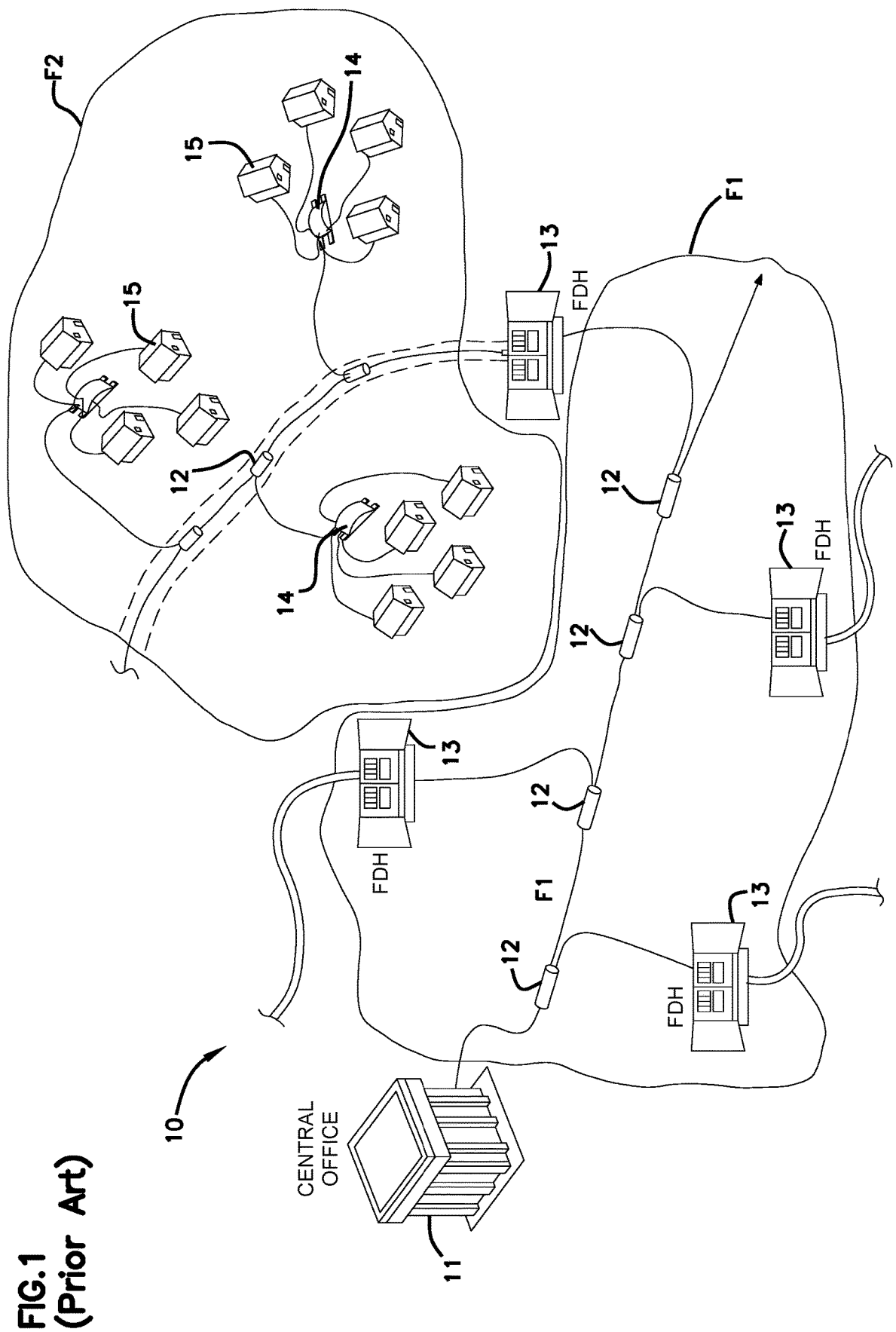
FIG. 1 shows an example fiber optic network.

In accordance with certain aspects of the disclosure, the cable spool 100 can be utilized in an optical network (e.g., optical network 10 of FIG. 1) to store excess slack length of cables routed between network locations (e.g., central office, fiber distribution hubs, indexing terminals, drop terminals, end user, etc.). For example, the cable spool 100 can be mounted at an end user location (e.g., to an outside of a residence, business, multi-dwelling unit; or to a pole or other surface adjacent the same). Slack length of a network cable (e.g., drop cable) routed to the end user location can be stored at the cable spool 100.

In accordance with certain aspects of the disclosure, the cable spool 100 and protective closure 141 provide a demarcation location 140 within the network (e.g., at the end user location). For example, the cable spool 100 and protective closure 141 can provide a connection point between the drop cable routed to the end user location and an optical fiber routed from inside a residence of the end user. The demarcation location 140 can be environmentally sealed to protect the connection (e.g., using the protective closure 141).

In some implementations, a cover or shroud 150 can be placed over the cable spool 100. In certain implementations, the cover or shroud 150 provides an aesthetic enhancement to the cable spool 100 or end user location. In certain implementations, the cover or shroud 150 functions as a snow shield. In certain implementations, the cover or shroud 150 may provide environmental protection (i.e., be watertight). The cable or shroud 150 defines a port through which the cable 120 passes as the cable 120 extends to the end 122.

In accordance with certain aspects, additional cabling may be needed to bring the signals carried by the cable 120 into the residence, business, multi-dwelling unit, or other building at which the cable spool 100 is attached. For example, a cable 160 can be routed between the cable spool 100 and an interior port (e.g., a wall outlet) within the building. The additional cable 160 has a first end 162 that connects to the end 124 of the cable 120. In some implementations, the first end 162 is connectorized and configured to plug into the adapter 145 disposed in the closure 141. In other implementations, the first end 162 is unconnectorized and configured to splice to an uncconectorized end 124 of the cable 120. In such implementations, the closure 141 would protect the splice.

In certain implementations, the additional cable 160 is deployed on a second cable spool 170. The second cable spool 170 is configured to hold any excess length of the additional cable 160 after deployment of the cable end 162 into the building. In certain implementations, the second cable spool 170 defines a central aperture that aids in rotating the spool (e.g., is sized to receive a spindle) to deploy the additional cable 160. In some implementations, the second cable spool 170 has a similar slotted configuration to the cable spool 100. In other implementations, however, the second cable spool 170 can have a larger slot (e.g., a slot that is about the same size as the drum).

In some implementations, the additional cable 160 is smaller in diameter than the cable 120. For example, the additional cable 160 can be less than 4 mm, less than 3 mm, less than 2 mm, about 1.2 mm, etc. Accordingly, in certain implementations, the additional cable 160 can be held at a smaller radius than the cable 120. Therefore, the drum 175 of the second cable spool 170 can be smaller in diameter than the drum 105 of the cable spool 100. In certain implementations, the additional cable 160 has a shorter length than the cable 120. Flanges 172 extending outwardly from the drum 175 of the second cable spool 170 may be smaller than the flanges 102, 104 of the cable spool 100.

In certain implementations, the second cable spool 170 is mounted to or adjacent the cable spool 100 for storage. In certain implementations, the second cable spool 170 can be smaller than the cable spool 100. In some implementations, the second cable spool 170 is sufficiently small to fit within the central aperture 103 of the cable spool 100. In such implementations, the second cable spool 170 can be mounted to the cable spool 100 or to the surface to which the cable spool 100 is mounted. In other implementations, the second cable spool 170 is larger than the central aperture 103, but still sufficiently small to mount within a footprint of the cable spool 100. In other implementations, the second cable spool 170 can be the same size or larger than the cable spool 100.

In some implementations, the cable spool 100 can be structured to hold the second cable spool 170. For example, the cable spool 100 can include latches 118 to engage the second cable spool 170. In other examples, the second cable spool 170 can be mounted to the cable spool 100 using brackets, fasteners, or other mounting structures. In still other examples, the second cable spool 170 can be mounted to a surface adjacent the cable spool 100 using brackets, fasteners, latches, or other mounting structures. In still yet other implementations, the cable spool 100 can be mounted to the second cable spool 170.

In certain implementations, the cover or shroud 150 can be placed over both the cable spool 100 and the second cable spool 170. For example, the cover or shroud 150 can be placed over the cable spool 100 with the second cable spool 170 mounted inside the central aperture 103. In other examples, the cover or shroud 150 can be placed over the cable spool 100 with the second cable spool 170 mounted to an exterior of the flange 102, 104 facing the cover or shroud 150.

FIGS. 9-20 illustrate another example cable spool assembly 240 configured in accordance with the principles of the present disclosure to store slack length of a cable (e.g., a drop cable). The cable spool assembly 240 includes a cable spool 200, a mounting bracket 230, and an optional locking cap 280. The mounting bracket 230 is secured to a mounting location (e.g., at an exterior of a residence of an end user). The cable spool 200 is disposed on the mounting bracket 230 to mount the cable spool 200 at the mounting location. The locking cap 280 may be used to maintain the cable spool 200 at the mounting bracket 230. In certain implementations, the locking cap 280 may inhibit rotation of the cable spool 200 relative to the mounting bracket 230 as will be described in more detail herein.

Figure 10:
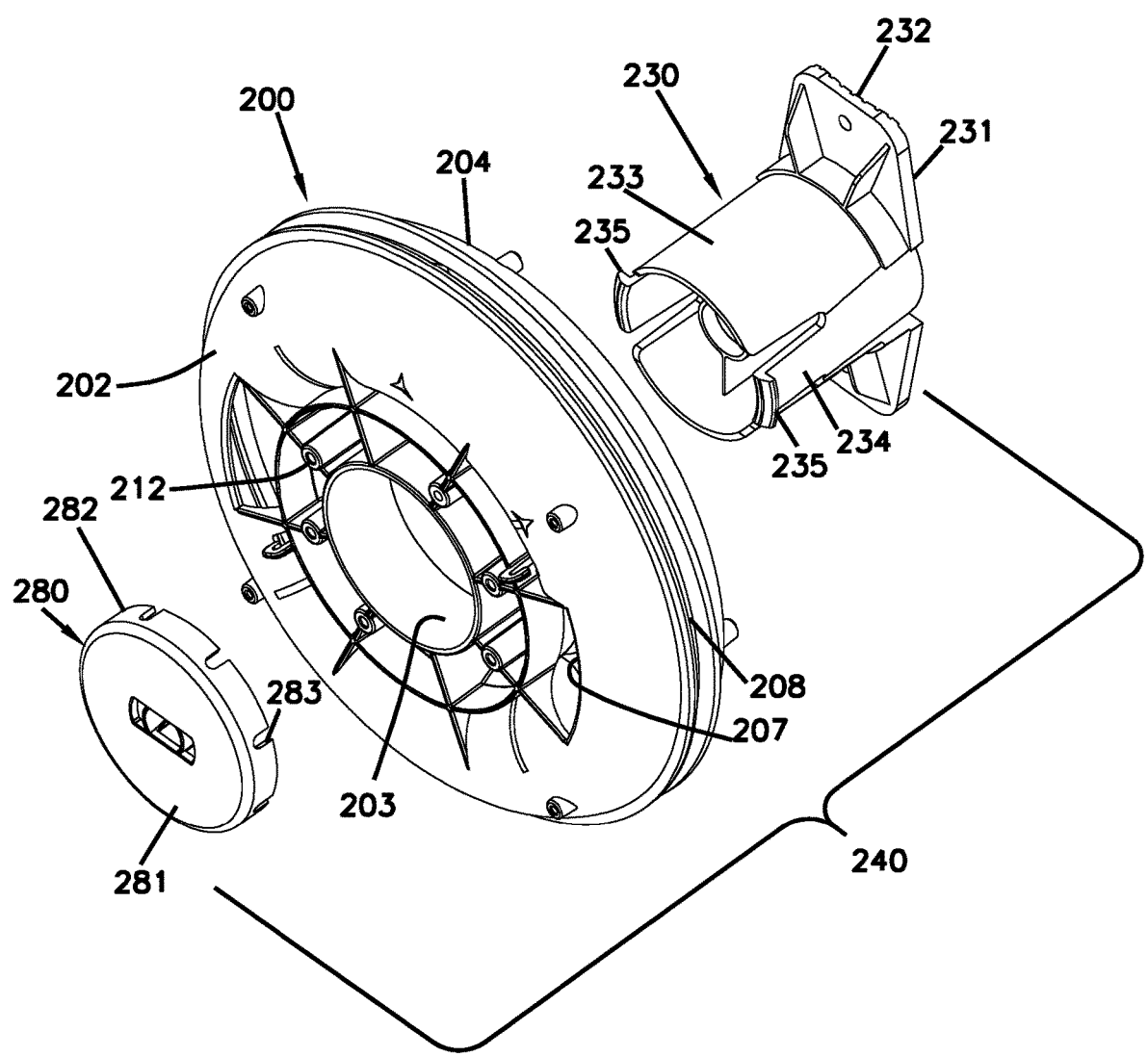
FIG. 10 is an exploded perspective view of the cable spool assembly of FIG. 9.
Figure 11:
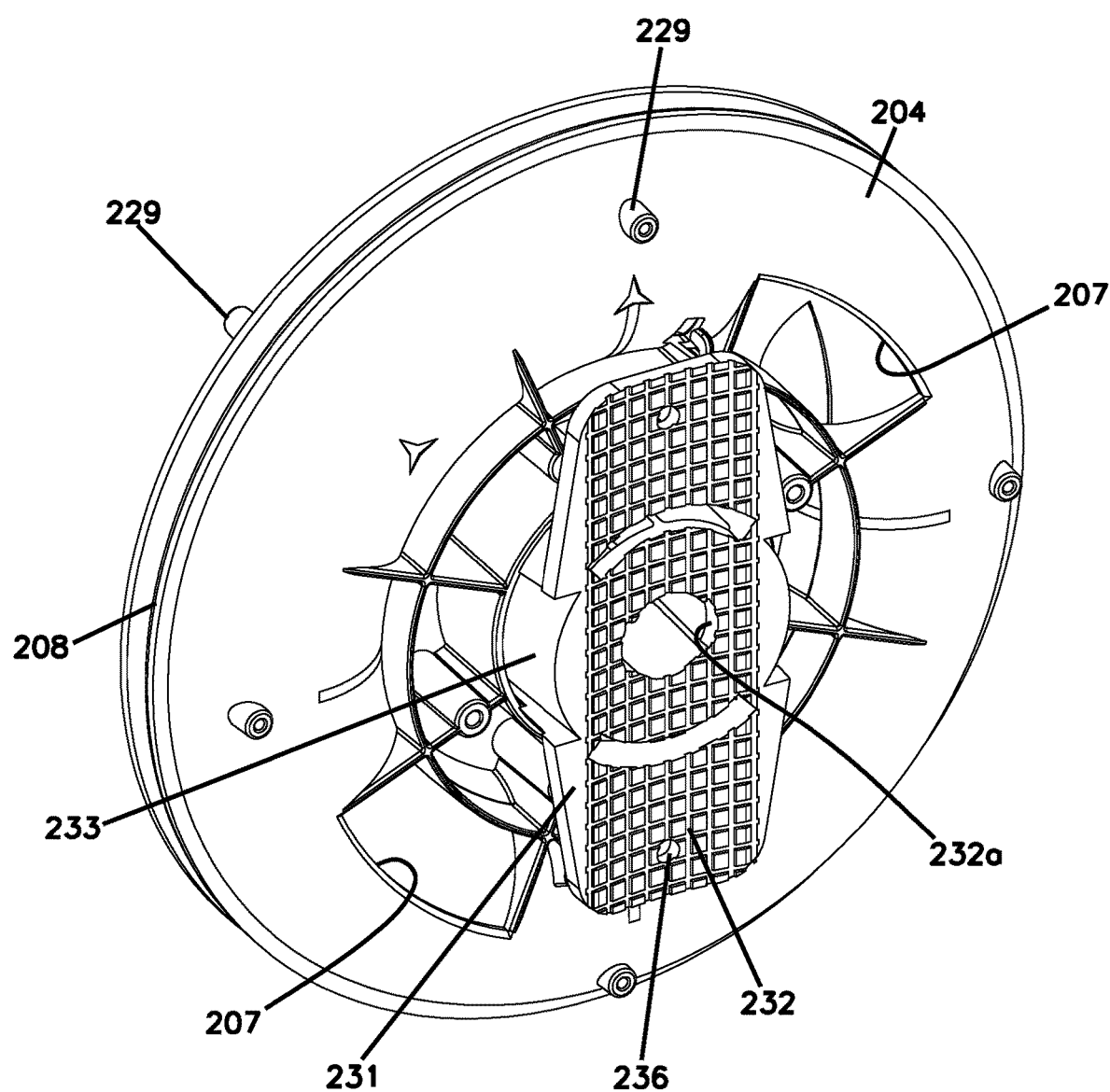
FIG. 11 is a rear perspective view of the cable spool assembly of FIG. 9.
Figure 12:
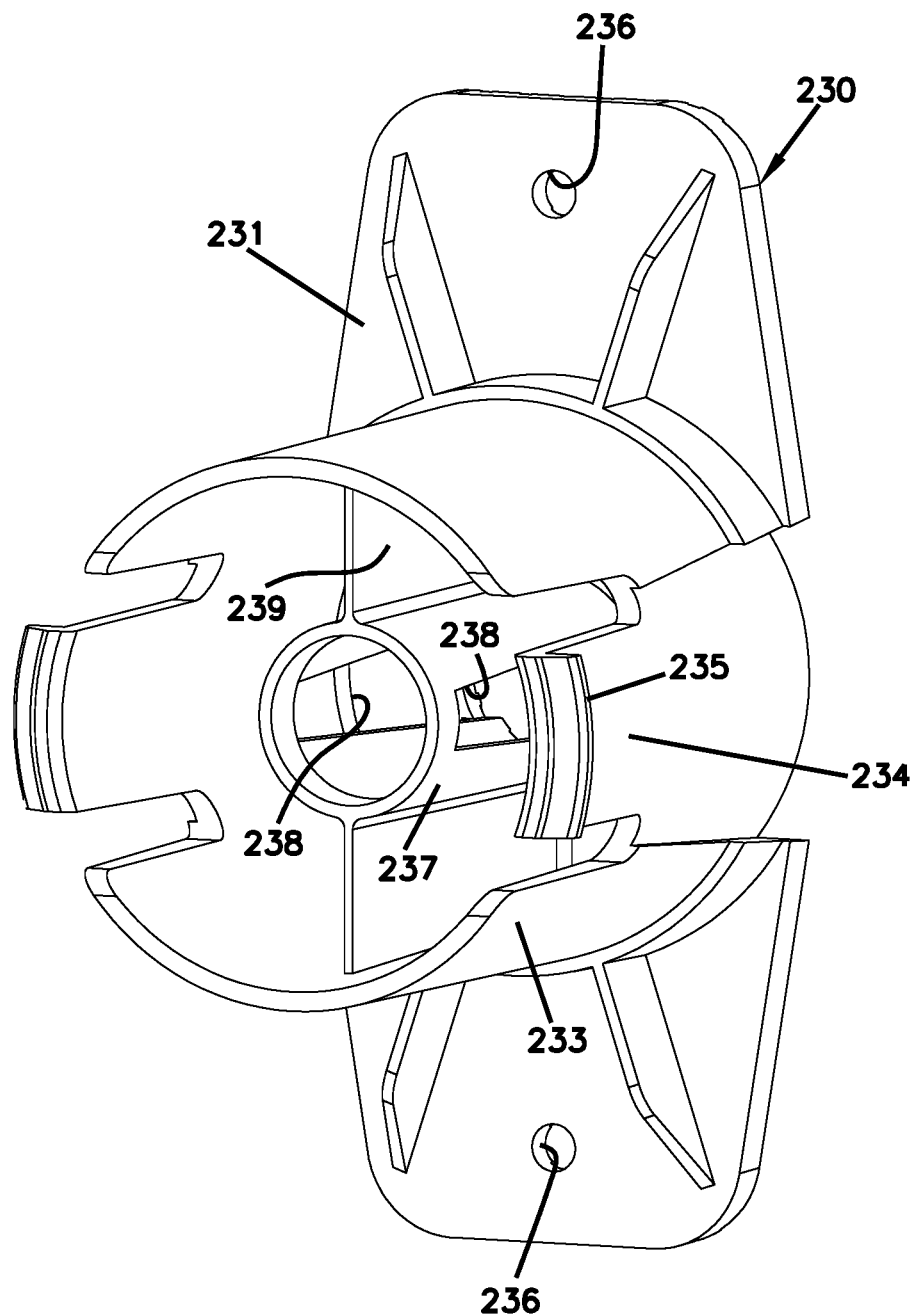
FIG. 12 is a perspective view of the mounting bracket of FIG. 9.
Figure 13:
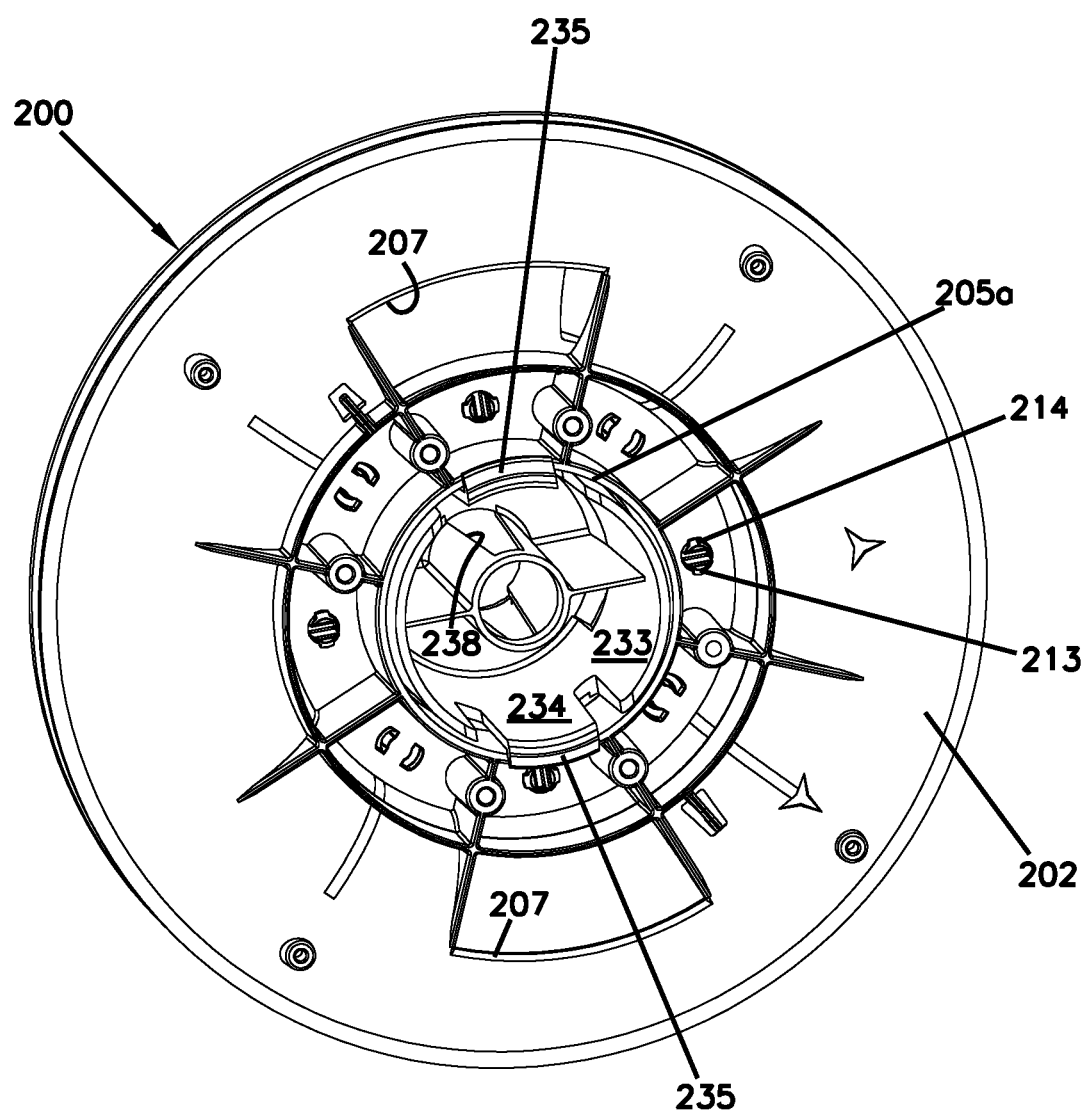
FIG. 13 is a perspective view of the cable spool of FIG. 9 mounted to the mounting bracket of FIG. 9 without the locking cap.
Figure 14:
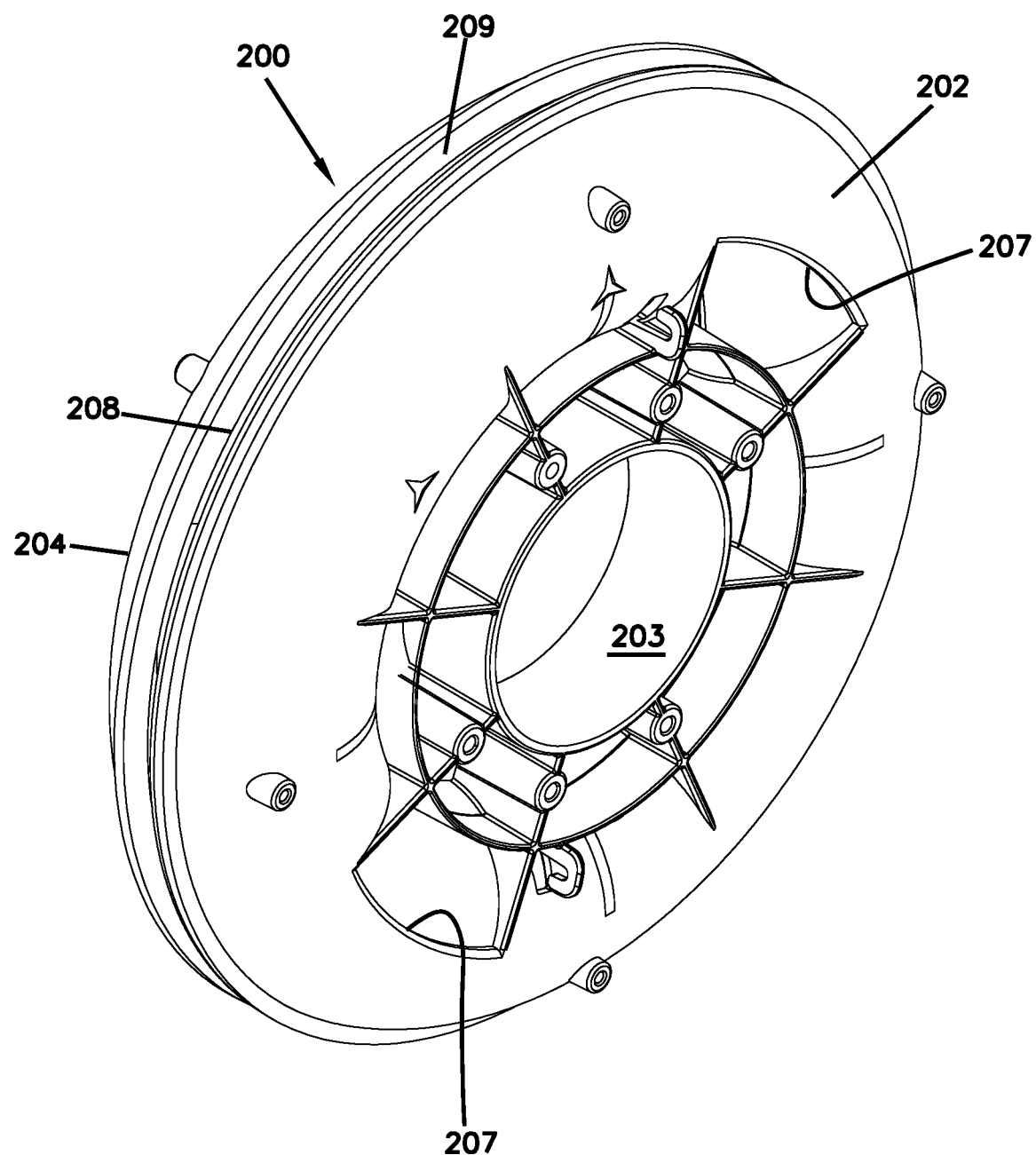
FIG. 14 is a perspective view of the cable spool of FIG. 9.
Figure 15:
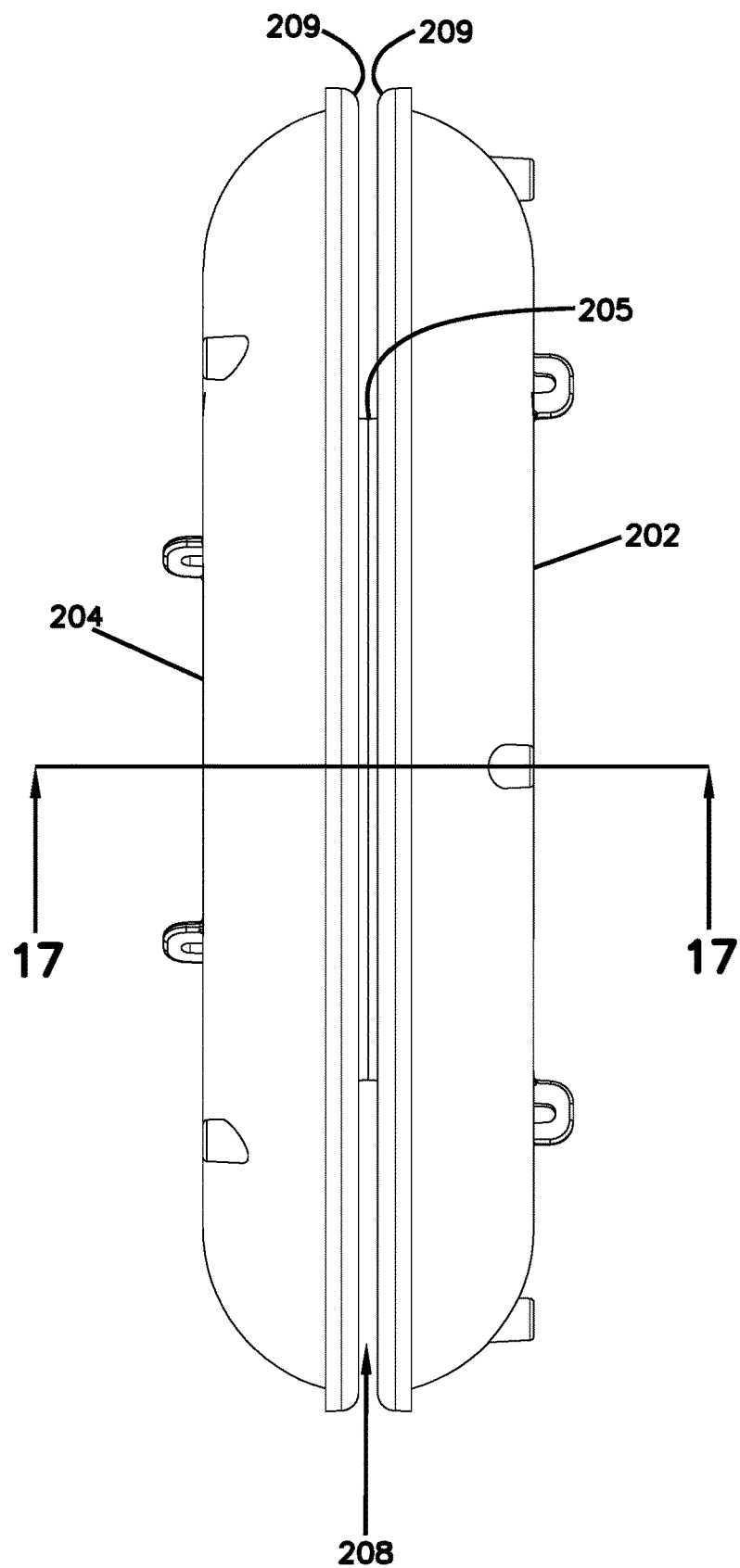
FIG. 15 is an end view of the cable spool of FIG. 14.

As shown in FIGS. 10-12, the mounting bracket 230 includes a base 231 configured to mount to a mounting surface. The base 231 defines a mounting surface 232 facing in a first direction relative to the base 231. In some examples, the mounting surface 232 is generally flat. In other examples, the mounting surface 232 is curved to accommodate the shape of a cable or pole to which the mounting bracket 230 could be attached. In certain examples, the mounting surface 232 has a textured surface to facilitate mounting to the mounting location. In certain implementations, the base 231 defines one or more fastener openings 236 sized to receive fasteners to hold the mounting bracket 231 to the mounting surface. In other implementations, the base 231 could define latches, slots to receive straps, or other mounting structures.

A support structure 233 extends from the base 231 in a second direction opposite the first direction. The support structure 233 is sized to fit within a central aperture 203 (FIG. 10) of the cable spool 200. The support structure 233 is sized and configured to hold the cable spool 200. In certain implementations, the support structure 233 includes one or more flexible arms 234 that define hooks 235 at ends distal from the base 231. The support structure 233 is sized so that the hooks 235 latch over a front rim 205a (FIG. 13) of the cable spool 200 to hold the cable spool 200 to the mounting bracket 230.

The cable spool 200 can be used to store excess length of the cable after deployment of the cable. The cable spool 200 can be mounted to the bracket 230, another bracket, or another mounting structure when the cable has been deployed. In some examples, the cable spool 200 hangs on the support structure 233 and the hooks 235 inhibit removal of the cable spool 200 from the support structure 233. In other examples, the cable spool 200 hangs on the hooks 235 (e.g., when the mounting bracket 230 is mounted to an aerial cable). Part of the cable also can be wound back on the cable spool 200 if too much is initially paid out from the cable spool 200.

FIGS. 13-16 illustrate another example cable spool 200 configured in accordance with the principles of the present disclosure. The cable spool 200 includes a drum 205 sized to correspond with a minimum bend radius of the cable. In certain implementations, the drum 205 has a radius that equals the minimum bend radius of the cable. In certain implementations, the drum 205 has a radius that is slightly larger than the minimum bend radius of the cable. In some implementations, the drum 205 defines a concave outer surface. In other implementations, the drum 205 defines a cylindrical outer surface.

The cable spool 200 defines an outer slot 208 through which a cable can be routed onto a drum 205 of the cable spool 200. The outer slot 208 is sized to apply friction to the cable as the cable passes through the outer slot 208. The outer slot 208 is sized to be less than a maximum width of the cable. In an example, the outer slot 208 is sized to be less than a diameter of a round cable. In another example, the outer slot 208 is sized to be less than a widest dimension of a flat, oblong, or other shaped cable. In certain implementations, the slot 208 expands to accommodate the cable when the cable passes through the slot 208.

In certain implementations, the cable spool 200 includes a first flange 202 extending radially outwardly from a first axial end of the drum 205 and a second flange 204 extending radially outwardly from a second axial end of the drum 205. Outer circumferential edges of the flanges 202, 204 are spaced from each other to define the slot 208. In certain examples, the outer circumferential edges can define a tapered or curved lip 209 to aid in guiding the cable through the slot 208. The flanges 202, 204 are sufficiently flexible to enable expansion of the slot 208 to accommodate the cable as a user pulls or pushes the cable through the slot 208. The flanges 202, 204 are sufficiently rigid to retain the cable unless a user applies a force to the cable.

In certain implementations, a portion of each of the flanges 202, 204 curves towards the opposite flange 204, 202 as the flange 202, 204 extends radially outwardly. The flanges 202, 204 cooperate to define an annular passageway 206 (FIG. 17) around the drum 205. The cable guided through the slot 208 and onto the drum 205 is wound within the annular passageway 206. In some implementations, the outer passageway 206 is at least twice as large as the slot 208. In certain implementations, the outer passageway 206 is at least three times as large as the slot 208. In certain implementations, the outer passageway 206 is at least four times as large as the slot 208. In certain implementations, the outer passageway 206 is at least five times as large as the slot 208.

In certain implementations, the cable spool 200 defines a central aperture 203 through the drum 205. In certain examples, the central aperture 203 is defined by a cylindrical inner surface of the drum 205. In certain examples, a rod or other supporting member can be inserted through the central aperture 203 to enable the cable spool 200 to be spun on the rod to facilitate deployment of a cable wound on the cable spool 200.

In certain implementations, at least one of the flanges 202, 204 defines a window aperture 207 that provides access to the annular passageway 206. In certain examples, the flange 202, 204 defines a plurality of circumferentially spaced window apertures 207. In certain examples, both flanges 202, 204 define a plurality of circumferentially spaced window apertures 207. In some examples, the window apertures 207 of the first flange 202 do not align with the window apertures 204 of the second flange 204. In other examples, however, the window apertures 207 of the first flange 202 align with the window apertures 204 of the second flange 204.

In certain examples, a second axial end of the cable can be inserted through the window aperture 207 so that the second axial end of the cable is disposed external of the cable spool 200. The cable can then be wound within the annular passageway 206. Prior to deployment, the first axial end of the cable can be disposed within the annular passageway 206 or external of the cable spool 200. The cable is deployed by pulling on the first axial end of the cable. The second axial end rotates with the cable spool 200 during deployment.

Figure 16:
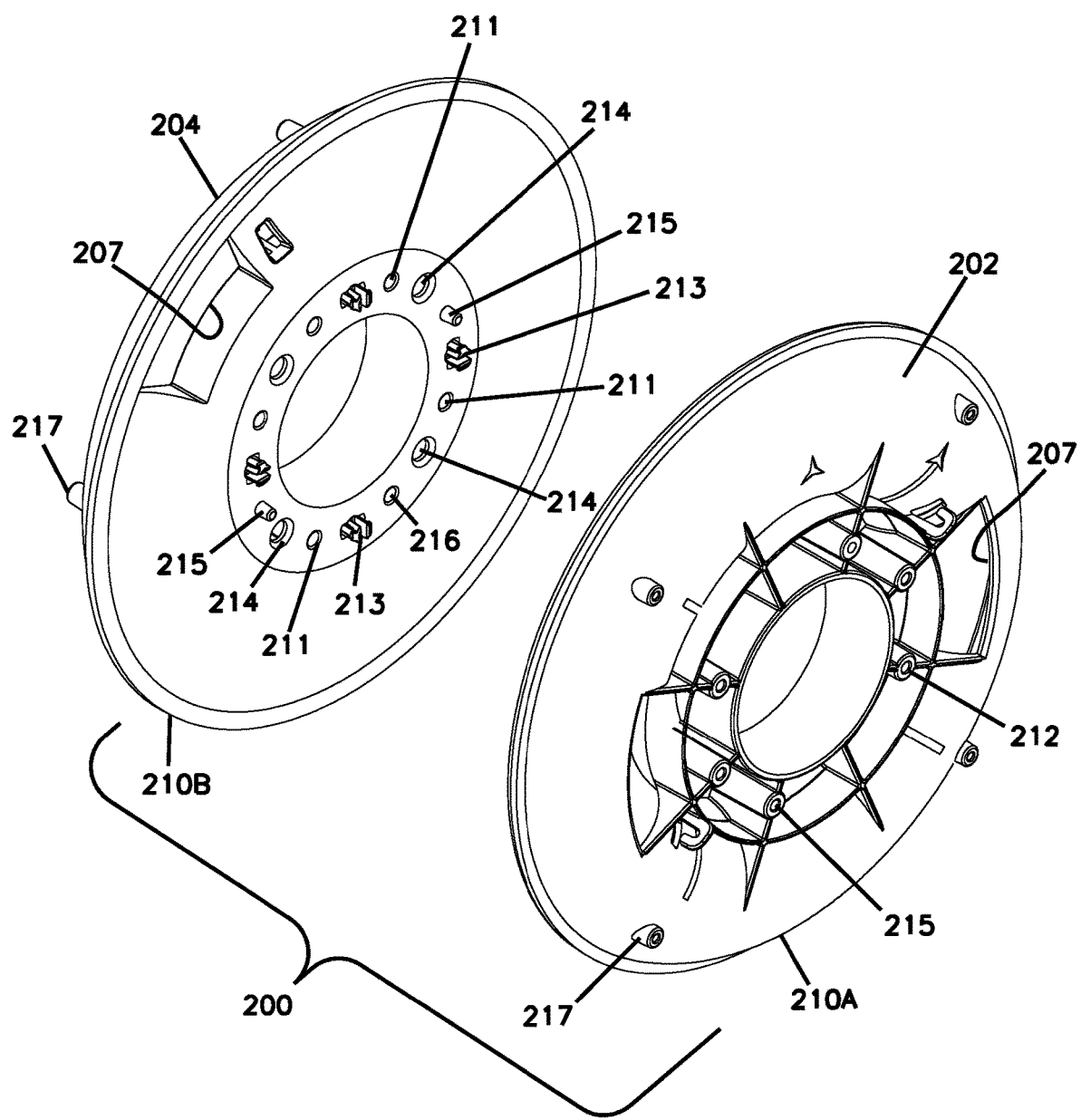
FIG. 16 is an exploded perspective view of the cable spool of FIG. 14.
Figure 17:
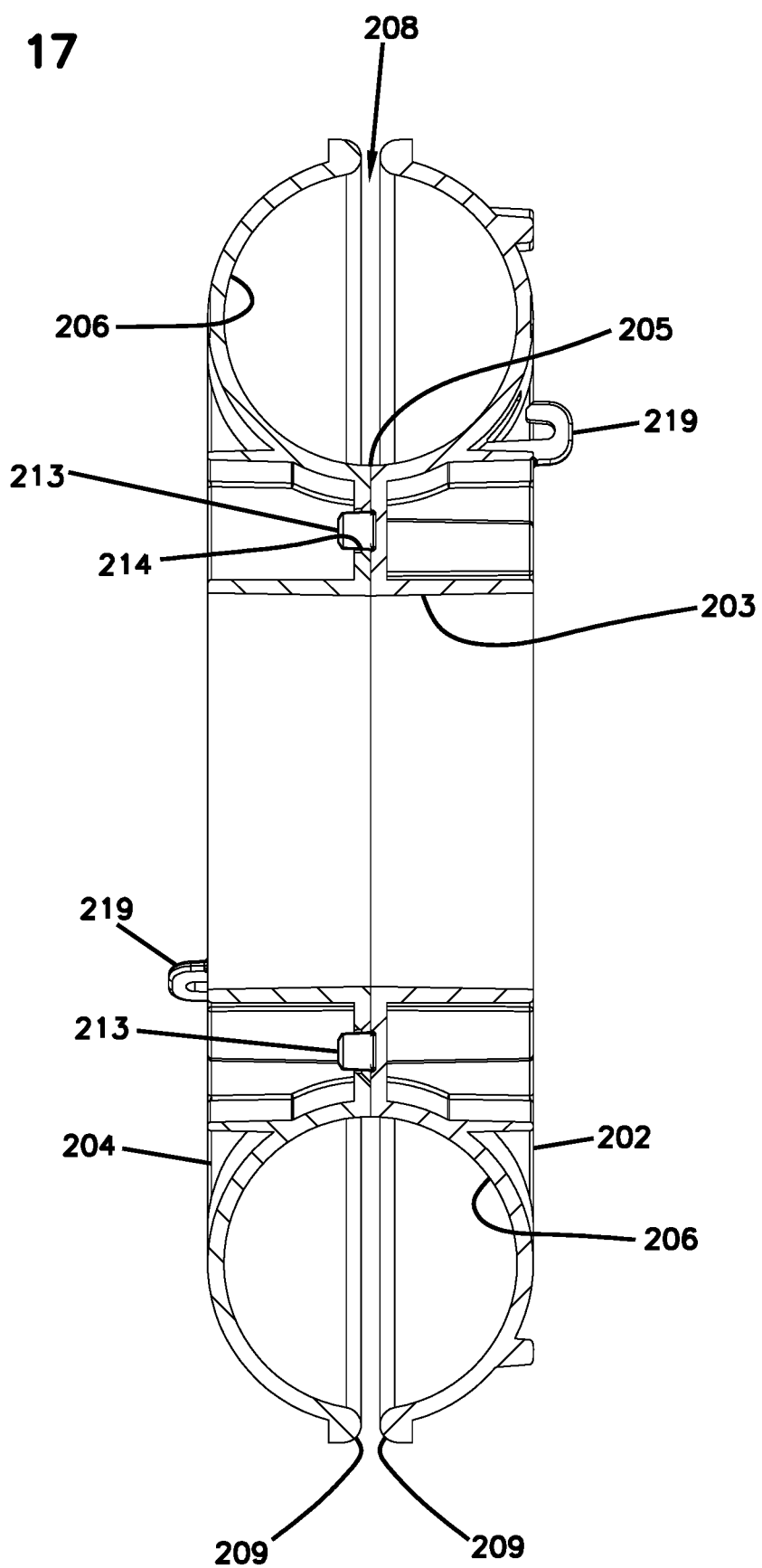
FIG. 17 is a cross-sectional view taken along the 17-17 line of FIG. 15.

As shown in FIG. 16, the cable spool 200 can be formed from a first housing member 210A and a second housing member 210B that couple together. In some implementations, the first and second housing members 210A, 210B cooperate to define the drum 205. In other implementations, one of the housing members 210A, 210B defines the drum 205. In certain implementations, each of the housing members 210A, 210B defines one of the flanges 202, 204. Accordingly, the housing members 210A, 210B cooperate to define the annular passageway 206. In some examples, the first and second housing members 210A, 210B are identical.

In certain implementations, the first and second housing members 210A, 210B latch together. For example, one or both housing members 210A, 210B may define latch members 213 sized to mate with latch holes 214 defined by the other housing member 210B, 210A. In certain implementations, the first and second housing members 210A, 210B can be attached using fasteners. In certain such implementations, each housing member 210A, 210B defines fastening apertures 211 through which the fasteners can be inserted. In certain implementations, each housing member 210A, 210B can define fastener support structures 212 defining inner threaded channels in which to receive the fasteners. In certain implementations, one or both of the first and second housing members 210A, 210B include alignment pegs 215 that align with alignment openings 216 of the other housing member 210B, 210A. In certain examples, the alignment openings 216 are formed in some of the fastener support structures 212.

In use, a user winds a cable onto the spool 200 by threading one end of the cable through the outer slot 208. In some implementations, the end is disposed within the annular passageway 206. In other implementations, the end is routed through one of the window apertures 207 of one of the flanges 202, 204. The user continues to wind the cable onto the spool 200 through the slot 208 to wrap the cable around the drum 205. In some implementations, the cable is wound until an opposite end of the cable is received in the passageway 206. In other implementations, the end of the cable remains external of the spool 200.

Figure 8:
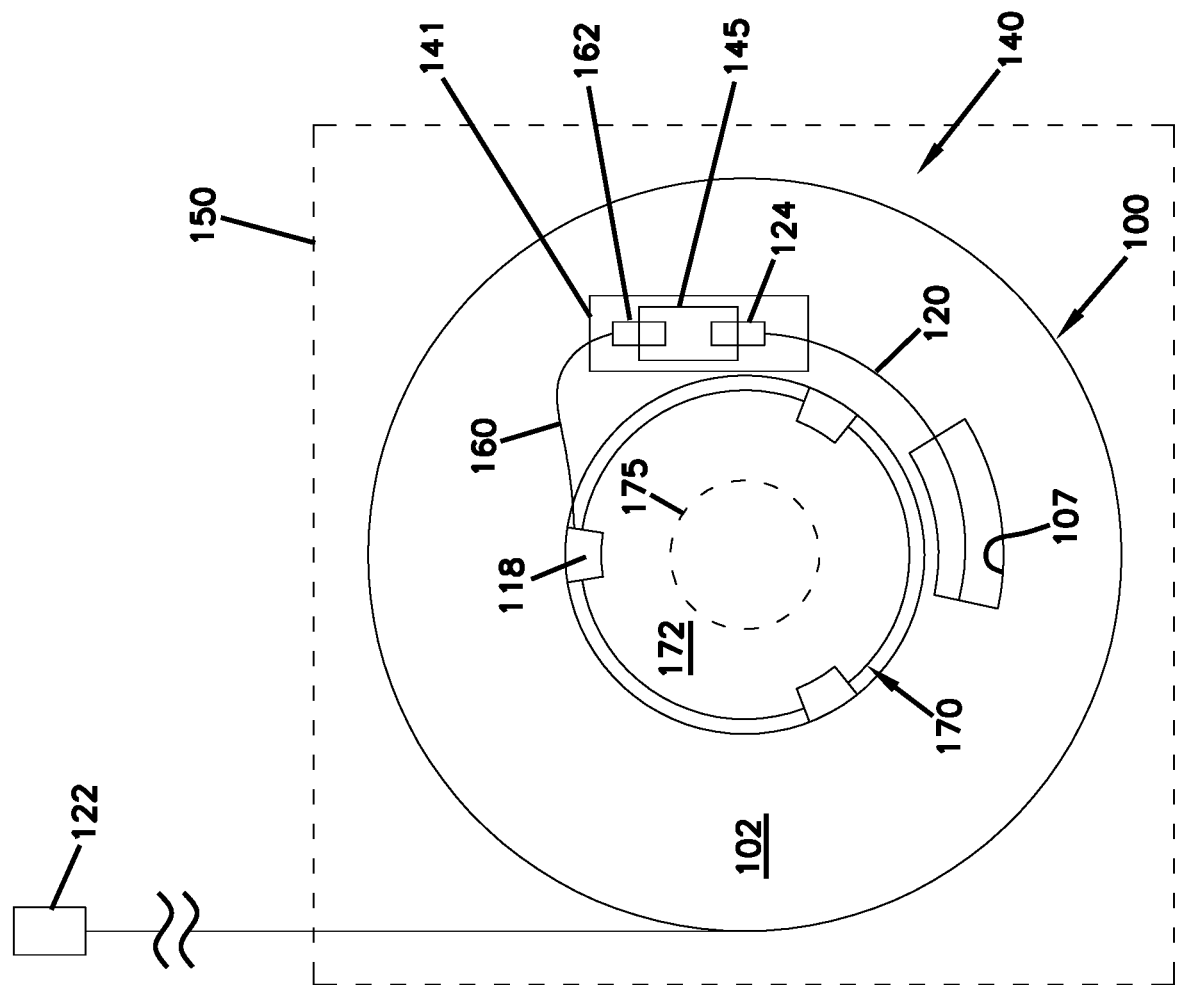
FIG. 8 is a diagram showing the cable spool of FIG. 2 mounted with a second spool holding slack of a second cable at an end user location, the second cable being routed from the second spool to an interior port at the end user location.
Figure 9:
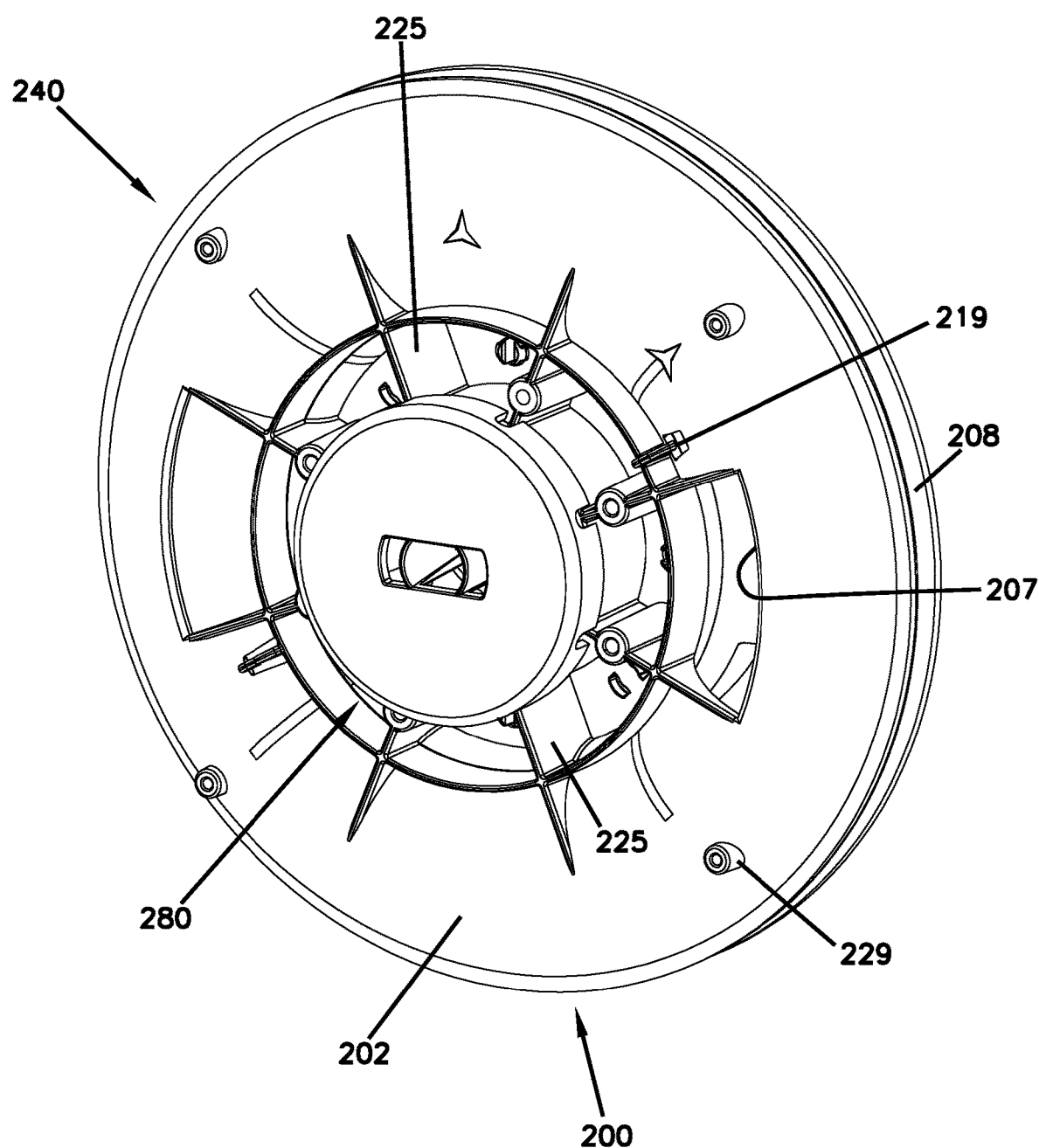
FIG. 9 is a perspective view of an example cable spool assembly including a cable spool, a mounting bracket, and a locking cap configured in accordance with the principles of the present disclosure.

In accordance with some aspects of the disclosure, the end of the cable that is routed through the window aperture 207 can be sealed within a protective closure, such as protective closure 141 of FIG. 8. The protective closure provides environmental sealing protection of the cable end. In some implementations, the cable end is connectorized. In certain examples, the connectorized end is received at an adapter disposed within the protective closure. In other implementations, the cable end is unconnectorized. In certain examples, the cable end can be connectorized in the field and plugged into the adapter. In certain examples, the unconnectorized end can be stored in the closure.

The protective closure revolves with the window aperture 207 of the cable spool 200 when the cable spool 200 rotates about a rotation axis extending through the central aperture 203. In certain implementations, the cable spool 200 is configured to carry the closure. For example, one of the flanges 202, 204 of the cable spool 200 may include latch fingers or other retention structures to receive the closure. In other implementations, however, the closure can be taped, tied, or otherwise secured to the cable spool 200. In still other implementations, the closure can be loose relative to the cable spool 200.

In certain implementations, the outer slot 208 is positioned relative to the drum and is sized relative to the cable so that the user winds the cable over the center of the cable and onto the drum 205. Accordingly, the size of the slot 208 inhibits the user from twisting the cable during winding. The size of the slot 208 also inhibits the cable from passing through the slot 208 without force being applied by the user. Accordingly, the annular passageway 206 can contain the cable against a spring force provided by bending strength members (e.g., fiberglass rods) of the cable.

In certain implementations, a portion of the cable also can be coiled external of the passage 206. For example, one or more loops of the cable can be formed external of the cable spool 200 and secured to an exterior of the cable spool 200 (e.g., using cable ties). In certain examples, tie-down support members 219 are disposed at an external surface of one or both flanges 202, 204. Cable ties can be inserted through the tie-down support members 219 and wrapped around the coil to hold the portion of the cable to the cable spool 200. In an example, the coil includes a sufficient length of cable to accommodate routing a respective end of the cable to a connection point.

In accordance with certain aspects of the disclosure, a locking cap 280 may facilitate retaining the cable spool 200 at the mounting bracket 230. In certain implementations, the locking cap 280 is configured to couple to the mounting bracket 230. In certain implementations, the locking cap 280 extends over at least a portion of the cable spool 200 when the locking cap 280 is coupled to the mounting bracket 230. In certain implementations, the locking cap 280 inhibits rotation of the cable spool 200 relative to the mounting bracket 230 when the locking cap 280 is disposed in a locked position relative to the mounting bracket 230 and cable spool 200.

Figure 18:
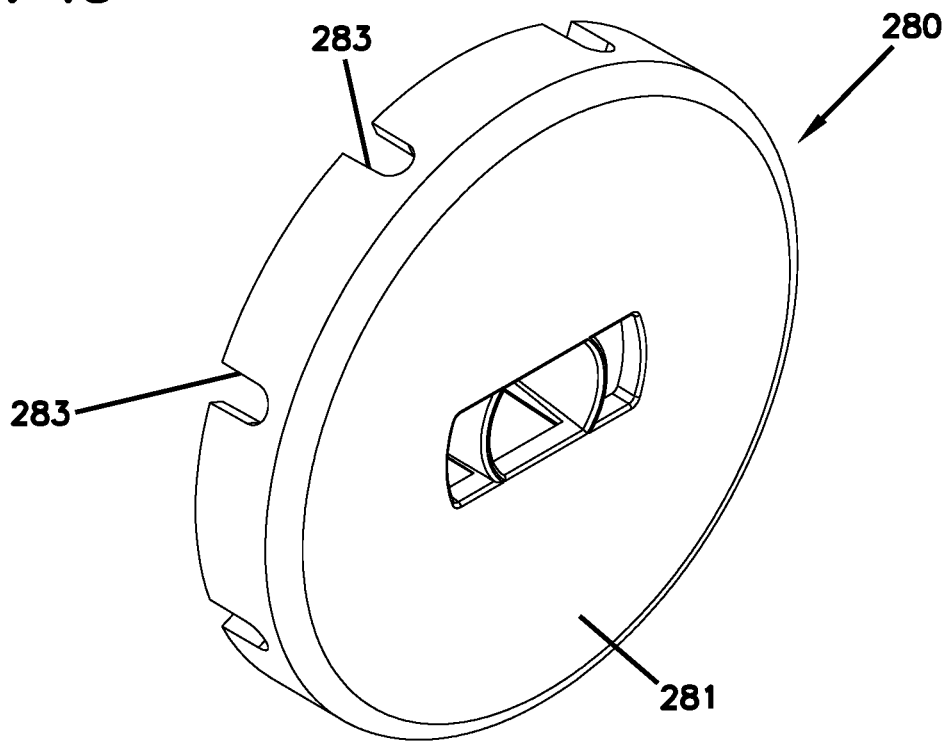
FIG. 18 is a front perspective view of the locking cap of FIG. 9.
Figure 19:
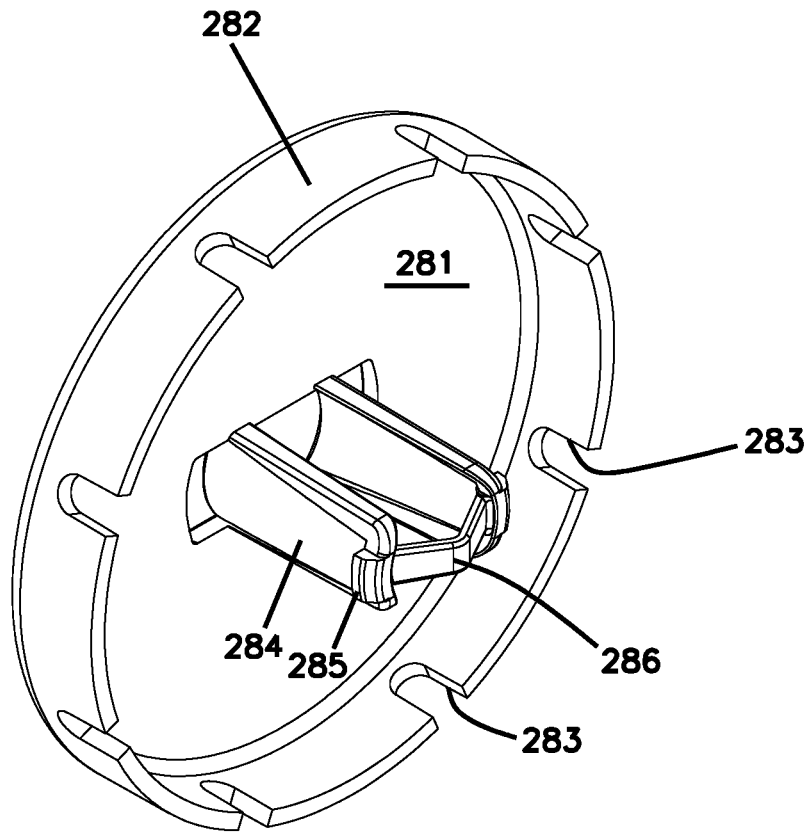
FIG. 19 is a rear perspective view of the locking cap of FIG. 9.

FIGS. 18-19 illustrate an example locking cap 280 structured and configured in accordance with the principles of the present disclosure. The locking cap 280 includes a base 281 from which an annular wall 282 extends. The wall 282 defines open-ended notches 283 facing away from the base 281. Flexible latching arms 284 also extend away from the base 281 within the wall 282. Each latching arm 284 defines a hook 285 at an end distal from the base 281. A biasing member 286 extends between the distal ends of the latching arms 284 to bias the hooks 285 outwardly.

The latching arms 284 and hooks 285 mate with the mounting bracket 230 to hold the locking cap 280 to the mounting bracket 230. As shown in FIG. 12, certain implementations of the mounting bracket 230 include a receiving structure 237 that extends from the base 231 in the second direction. The receiving structure 237 is located within the support structure 233. In certain examples, the receiving structure 237 is coaxial with the support structure 233. In certain examples, the receiving structure 237 extends less far from the base 231 than the support structure 233. In certain examples, one or more ribs 239 extend between the support structure 233 and the receiving structure 237. The receiving structure 237 defines one or more apertures 238. In certain examples, each aperture 238 tapers inwardly as the aperture 238 extends away from the base 231. In certain examples, the receiving structure 237 defines a passage leading to an aperture 232a defined by the base 231. In certain examples, the apertures 238 lead to the passage.

Figure 20:
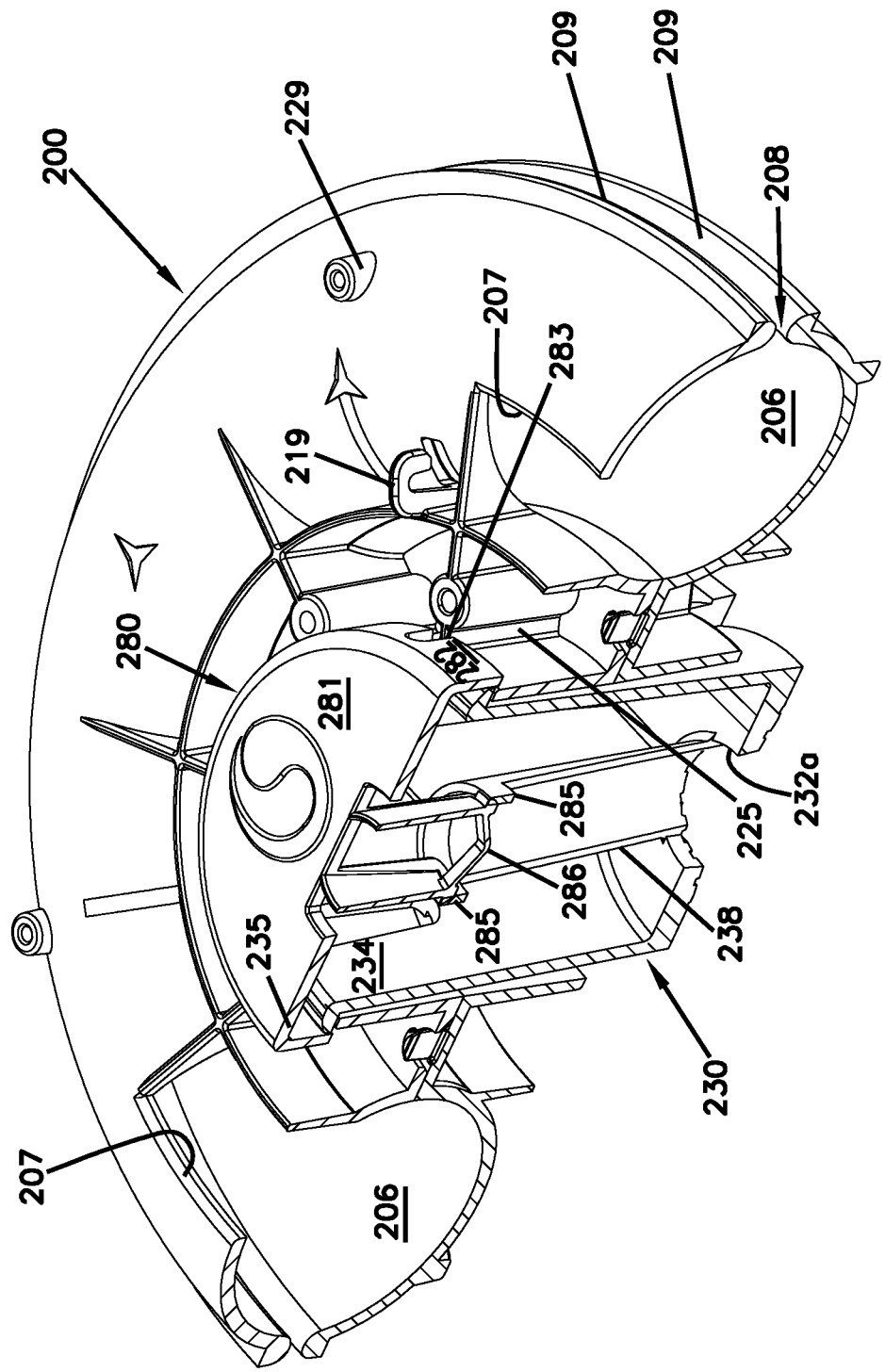
FIG. 20 is a cross-sectional view of the cable spool assembly of FIG. 9 showing the locking cap inhibiting rotation of the cable spool relative to the mounting bracket.

As shown in FIG. 20, the latching arms 284 of the locking cap 280 flex inwardly as they enter the receiving structure 237 of the mounting bracket 230 when the locking cap 280 is disposed over the support structure 233. When the latching hooks 285 of the locking cap 280 reach the apertures 238 of the receiving structure 237, the biasing member 286 pushes the hooks 285 through the apertures 238 to latch to the receiving structure 237. The latching hooks 285 hold the locking cap 280 to the mounting bracket 230.

In certain implementations, the notches 283 of the locking cap 280 align with ribs 225 of the cable spool 200 when the cable spool 200 and locking cap 280 are both disposed on the mounting bracket 230. In certain implementations, the ribs 225 are received within the notches 283 of the locking cap 280 when the locking cap 280 is latched to the mounting bracket 230. Interaction between the wall 282 and the ribs 225 inhibits rotation of the cable spool 200 relative to the locking cap 280. Interaction between the hooks 285 and the receiving structure 237 inhibits rotation of the locking cap 280 relative to the mounting bracket 230.

In certain implementations, a cover or shroud, such as cover or shroud 150 of FIG. 8, can be mounted over the mounting bracket 230, cable spool 200, and locking cap 280. In certain examples, the cover or shroud functions as a snow shield. In certain examples, the cover or shroud is environmentally sealed. In certain examples, the cover or shroud is an aesthetic cover that is not environmentally sealed.

In accordance with certain aspects of the disclosure, the cable spool 200 can be configured to mount to a disposable spool for deployment in the field. In certain implementations, the cable spool 200 includes one or more fastener support structures 229 disposed radially outwardly from the fastener support structures 212. Long fasteners can be inserted through the fastener support structures 229 and through portions of the disposable spool.

Figure 21:
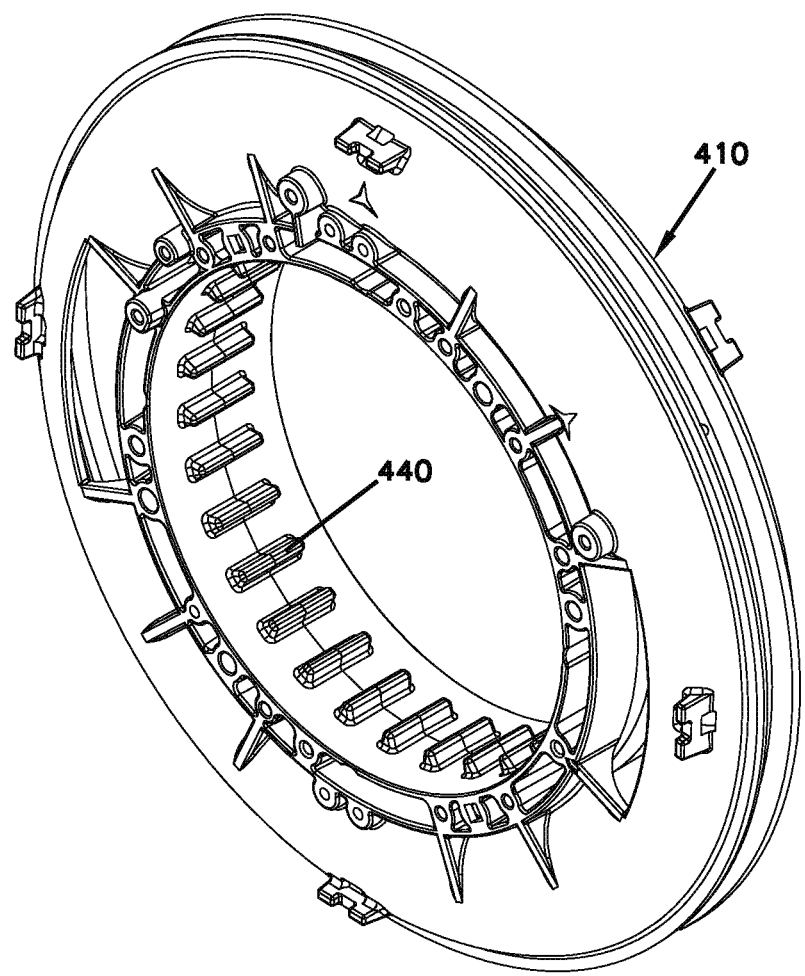
FIG. 21 is a perspective view of another example cable spool configured in accordance with the principles of the present disclosure.

FIG. 21 illustrates another example cable spool 410 having flexible, closely spaced flanges that are substantially similar to the flanges 102, 104, 202, 204. In certain implementations, the cable spool 410 includes teeth 440 extending radially into the central aperture 103, 203. In certain implementations, the flanges of the cable spool 410 include external structure that facilitates attachment of cable ties or other fastening structures.

Additional information about example mounting brackets suitable for use in holding the cable spool 100, 200, 410 can be found in copending PCT Application No. PCT/US2017/016983, filed Feb. 8, 2017, and titled "Cable Slack Storage System for Terminal," the disclosure of which is hereby incorporated herein by reference.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A cable spool arrangement for retaining slack length of a cable, the cable spool arrangement comprising:
  a mounting bracket including a base and a support member extending forwardly of the base; and
  a cable spool frictionally retaining a cable wound thereon, the cable spool being sized and shaped to mount to the support member so that the cable spool is rotatable about the support member, the cable spool including a drum, a first flange disposed at a first axial end of the drum, and a second flange disposed at a second axial end of the drum, the first and second flanges cooperating to define an annular passageway around the drum, the first and second flanges curving towards each other so that the annular passageway has a rounded transverse cross-sectional profile.

2. The cable spool arrangement of claim 1, wherein the support member includes a hook at a forward end to retain the cable spool on the support member.

3. The cable spool arrangement of claim 1, further comprising a locking cap that couples to the support member of the mounting bracket to retain the cable spool at the mounting bracket.

4. The cable spool arrangement of claim 3, wherein the locking cap extends over a portion of the cable spool when the locking cap is coupled to the mounting bracket.

5. The cable spool arrangement of claim 3, wherein the locking cap latches to the mounting bracket.

6. The cable spool arrangement of claim 3, wherein the locking cap inhibits rotation of the cable spool relative to the mounting bracket.

7. The cable spool arrangement of claim 6, wherein the locking cap engages the cable spool to inhibit rotation.

8. The cable spool arrangement of claim 1, further comprising a shroud mounted over the mounting bracket, the cable spool, and the locking cap.

9. The cable spool arrangement of claim 8, wherein the shroud is environmentally sealed.

10. The cable spool arrangement of claim 8, wherein the shroud is not environmentally sealed.

11. The cable spool arrangement of claim 1, further comprising a disposable spool to which the cable spool mounts prior to being mounted to the mounting bracket.

12. The cable spool arrangement of claim 1, wherein distal ends of the flanges are spaced from each other to define a slot through which the cable can be wound onto the cable spool.

13. The cable spool arrangement of claim 12, wherein outer circumferential edge of each flange defines a tapered or curved lip to aid in guiding the cable through the slot.

14. The cable spool arrangement of claim 13, wherein the tapered or curved lips define an annular passageway therebetween that leads to the slot, the annular passageway being larger than the slot.

15. The cable spool arrangement of claim 12, wherein the flanges are sufficiently flexible to enable expansion of the slot to accommodate the cable as a user pulls or pushes the cable through the slot.

16. The cable spool arrangement of claim 1, wherein the cable extends between a first end and a second end, the first end being accessible to a user when the cable is wound on the cable spool to facilitate deployment of the cable, the second end of the cable being fixed relative to the cable spool.

17. The cable spool arrangement of claim 1, wherein the second end of the cable is terminated by a connector disposed inside of a sealed closure that is carried with the cable spool.

* * * * *

UNITED STATES PATENT AND TRADEMARK OFFICE
CERTIFICATE OF CORRECTION

PATENT NO. : 10,606,016 B2  
APPLICATION NO. : 16/154249  
DATED : March 31, 2020  
INVENTOR(S) : Thomas Marcouiller Page 1 of 1

It is certified that error appears in the above-identified patent and that said Letters Patent is hereby corrected as shown below:

In the Specification

Column 1, Line 9: "10,094,994," should read --10,094,997,--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*